(12) United States Patent
Variani et al.

(10) Patent No.: US 11,783,849 B2
(45) Date of Patent: *Oct. 10, 2023

(54) ENHANCED MULTI-CHANNEL ACOUSTIC MODELS

(71) Applicant: Google LLC, Mountain View, CA (US)

(72) Inventors: Ehsan Variani, Mountain View, CA (US); Kevin William Wilson, Cambridge, MA (US); Ron J. Weiss, New York, NY (US); Tara N. Sainath, Jersey City, NJ (US); Arun Narayanan, Santa Clara, CA (US)

(73) Assignee: Google LLC, Mountain View, CA (US)

( * ) Notice: Subject to any disclaimer, the term of this patent is extended or adjusted under 35 U.S.C. 154(b) by 235 days.

This patent is subject to a terminal disclaimer.

(21) Appl. No.: 17/303,822

(22) Filed: Jun. 8, 2021

(65) Prior Publication Data

US 2021/0295859 A1  Sep. 23, 2021

Related U.S. Application Data

(63) Continuation of application No. 16/278,830, filed on Feb. 19, 2019, now Pat. No. 11,062,725, which is a
(Continued)

(51) Int. Cl.
*G10L 15/16* (2006.01)
*G10L 25/30* (2013.01)
(Continued)

(52) U.S. Cl.
CPC .............. *G10L 25/30* (2013.01); *G10L 15/16* (2013.01); *G10L 15/20* (2013.01); *G10L 19/008* (2013.01);
(Continued)

(58) Field of Classification Search
CPC ................................ G10L 15/16; G10L 15/22
See application file for complete search history.

(56) References Cited

U.S. PATENT DOCUMENTS

| 4,802,225 A | 1/1989 | Patterson |
| 5,737,485 A | 4/1998 | Flanagan et al. |
| (Continued) | | |

OTHER PUBLICATIONS

Highlander, Tyler, and Andres Rodriguez. "Very efficient training of convolutional neural networks using fast fourier transform and overlap-and-add." arXiv preprint arXiv:1601.06815 (2016). (Year: 2016).*

(Continued)

*Primary Examiner* — Jialong He
(74) *Attorney, Agent, or Firm* — Honigman LLP; Brett A. Krueger; Grant J. Griffith

(57) ABSTRACT

This specification describes computer-implemented methods and systems. One method includes receiving, by a neural network of a speech recognition system, first data representing a first raw audio signal and second data representing a second raw audio signal. The first raw audio signal and the second raw audio signal describe audio occurring at a same period of time. The method further includes generating, by a spatial filtering layer of the neural network, a spatial filtered output using the first data and the second data, and generating, by a spectral filtering layer of the neural network, a spectral filtered output using the spatial filtered output. Generating the spectral filtered output comprises processing frequency-domain data representing the spatial filtered output. The method still further includes processing, by one or more additional layers of the neural network, the spectral filtered output to predict sub-word units encoded in both the first raw audio signal and the second raw audio signal.

20 Claims, 8 Drawing Sheets

Related U.S. Application Data continuation of application No. 15/350,293, filed on Nov. 14, 2016, now Pat. No. 10,224,058.

(60) Provisional application No. 62/384,461, filed on Sep. 7, 2016.

(51) Int. Cl.
  G10L 21/028 (2013.01)
  G10L 21/0388 (2013.01)
  G10L 19/008 (2013.01)
  G10L 15/20 (2006.01)
  G10L 21/0208 (2013.01)
  G10L 21/0216 (2013.01)

(52) U.S. Cl.
  CPC ........ G10L 21/028 (2013.01); G10L 21/0388 (2013.01); *G10L 2021/02087* (2013.01); *G10L 2021/02166* (2013.01)

(56) References Cited

U.S. PATENT DOCUMENTS

| | | |
|---|---|---|
| 5,805,771 A | 9/1998 | Muthusamy et al. |
| 7,072,832 B1 | 7/2006 | Su et al. |
| 9,697,826 B2 | 7/2017 | Sainath et al. |
| 2005/0015251 A1 | 1/2005 | Pi et al. |
| 2013/0166279 A1 | 6/2013 | Dines et al. |
| 2014/0142929 A1 | 5/2014 | Seide et al. |
| 2014/0288928 A1 | 9/2014 | Penn et al. |
| 2015/0058004 A1 | 2/2015 | Dimitriadis et al. |
| 2015/0095026 A1 | 4/2015 | Bisani et al. |
| 2015/0161522 A1 | 6/2015 | Saon et al. |
| 2015/0269933 A1 | 9/2015 | Yu et al. |
| 2015/0293745 A1 | 10/2015 | Suzuki et al. |
| 2015/0340034 A1 | 11/2015 | Schalkwyk et al. |
| 2016/0078863 A1 | 3/2016 | Chung et al. |
| 2016/0111107 A1 | 4/2016 | Erdogan et al. |
| 2016/0180838 A1 | 6/2016 | Parada San Martin et al. |
| 2016/0232440 A1 | 8/2016 | Gregor et al. |
| 2016/0240210 A1 | 8/2016 | Lou |
| 2016/0283841 A1 | 9/2016 | Sainath et al. |
| 2016/0322055 A1 | 11/2016 | Sainath et al. |
| 2016/0358606 A1 | 12/2016 | Ramprashad et al. |
| 2017/0048641 A1 | 2/2017 | Franck |
| 2017/0092265 A1* | 3/2017 | Sainath ............... G06N 3/044 |
| 2017/0148433 A1 | 5/2017 | Catanzaro et al. |
| 2017/0162194 A1 | 6/2017 | Nesta et al. |
| 2017/0278513 A1 | 9/2017 | Li et al. |
| 2017/0325023 A1 | 11/2017 | Nongpiur |
| 2017/0330586 A1 | 11/2017 | Roblek et al. |

OTHER PUBLICATIONS

Heigold et al., "Asynchronous Stochastic Optimization for Sequence Training of Deep Neural Networks," 2014 IEEE International Conference on Acoustic, Speech and Signal Processing, pp. 5624-5628, 2014.

Hertel et al., "Comparing Time and Frequency Domain for Audio Event Recognition Using Deep Learning," arXiv preprint arXiv:1603.05824 (2016), 5 pages.

Hinton et al., "Deep Neural Networks for Acoustic Modeling in Speech Recognition," Signal Processing Magazine, IEEE, 29(6):82-97, Apr. 2012.

Hirose et al. "Generalization characteristics of complex-valued feedforward neural networks in relation to signal coherence," IEEE Transaction in neural Networks and Learning Systems, vol. 23(4) Apr. 2012, 11 pages.

Hirose. "Chapter: Complex-Valued Neural Networks: Distinctive Features," Complex-Valued Neural Networks, Studies in Computational Intelligence, vol. 32, Springer 2006, 19 pages.

Hochreiter and Schmidhuber, "Long Short-Term Memory," Neural Computation, vol. 9, No. 8, pp. 1735-1780, 1997.

Hoshen et al., "Speech Acoustic Modeling From Raw Multichannel Waveforms," International Conference on Acoustics, Speech, and Signal Processing, pp. 4624-4628, Apr. 2015.

Huang et al., "An Analysis of Convolutional Neural Networks for Speech Recognition," Acoustics, Speech and Signal Processing (ICASSP), 2015 IEEE International Conference on. IEEE, Apr. 2015, pp. 4989-4993.

Hughes and Mierle, "Recurrent Neural Networks for Voice Activity Detection," Acoustics, Speech and Signal Processing (ICASSP), 2013 IEEE International Conference on, pp. 7378-7382, May 2013.

International Search Report and Written Opinion in International Application No. PCT/US2016/043552, dated Sep. 23, 2016, 12 pages.

Jaitly and Hinton, "Learning a Better Representation of Speech Sound Waves Using Restricted Boltzmann Machines," in Proc. ICASSP, 2011, 4 pages.

Jing et al. "Tunable Efficient Unitary Neural Networks (EUNN) and their application to RNNs," arXiv 1612.05231v2, Feb. 26, 2017, 9 pages.

Jing et al. "Tunable Efficient Unitary Neural Networks (EUNN) and their application to RNNs," Proceedings of the International Conference on Machine Learning, Aug. 2017, arXiv 1612.05231v3, Apr. 3, 2017, 9 pages.

Kello and Plant, "A neural network model of the articulatory-acoustic forward mapping trained on recordings of articulatory parameters," J. Acoust. Soc. Am. 116 (4), Pt. 1, pp. 2354-2364, Oct. 2004.

Kim and Chin, "Sound Source Separation Algorithm Using Phase Difference and Angle Distribution Modeling Near the Target," in Proc. Interspeech, 2015, 5 pages.

Kingma et al. "Adam: A method for stochastic optimization," arXiv 1412.6980v9, Jan. 30, 2017, 15 pages.

Law et al. "Input-agreement: a new mechanism for collecting data using human computation games," In Proceedings of the SIGCHI Conference on Human Factors in Computing Systems, 2009, 10 pages.

Le Cun et al. "Handwritten digit recognition with a back-propagation network," Advances in neural information processing systems, 1990, 9 pages.

Lewicki. "Efficient coding of natural sounds," Nature neuroscience, 2002, 5.4: 8 pages.

Liao et al. "Large vocabulary automatic speech recognition for children," Sixteenth Annual Conference of the International Speech Communication Associates, 2015, 5 pages.

Lin et al. "Network in network," arXiv preprint arXiv, 2013, 1312.4400, 10 pages.

Linsker. "Perceptual neural organization; Some approaches based on network models and information theory," Annual review of Neuroscience, 13(1) 1990, 25 pages.

Maas et al., "Recurrent Neural Networks for Noise Reduction in Robust ASR," Interspeech 2012, 4 pages, 2012.

Mathieu et al. "Fast training of convolutional networks through ffts," CoRR, 2015, abs/1312.5851, 9 pages.

Mhammedi et al. "Efficient orthogonal parametrization of recurrent neural networks using householder reflections," Proceedings of the International Conference on Machine Learning, Jul. 2017, arXiv 1612.00188v5, Jun. 13, 2017, 12 pages.

Misra, "Speech/Nonspeech Segmentation in Web Videos," Proceedings of Interspeech 2012, 4 pages, 2012.

Mitra et al., "Time-Frequency Convolutional Networks for Robust Speech Recognition," 2015 IEEE Workshop on Automatic Speech Recognition and Understanding (ASRU). IEEE, 2015, 7 pages.

Mohamed et al., "Understanding how Deep Belief Networks Perform Acoustic Modelling," in ICASSP, Mar. 2012, pp. 4273-4276.

Narayanan and Wang, "Ideal Ratio Mask Estimation Using Deep Neural Networks for Robust Speech Recognition," Acoustics, Speech and Signal Processing (ICASSP), 2013 IEEE International Conference on, pp. 7092-7096, May 2013.

Nitta. "Chapter 7:" Complex-valued Neural Networks: Utilizing High-Dimensional Parameters, Information Science Reference—Imprint of: IGI Publishing, Hershey, PA, Feb. 2009, 25 pages.

(56) References Cited

OTHER PUBLICATIONS

Palaz et al. "Analysis of cnn-based speech recognition system using raw speech as input," Proceedings of Interspeech, 2015, epfl-conf-210029, 5 pages.

Palaz et al. "Estimating phoneme class conditional probabilities from raw speech signal using convolutional neural networks," arXiv preprint arXiv: 2013, 1304.1018 : 5 pages.

Palaz et al., "Estimating Phoneme Class Conditional Probabilities From Raw Speech Signal using Convolutional Neural Networks," in Proc. Interspeech, 2014, 5 pages.

Patterson et al., "An efficient auditory filterbank based on the gammatone function," in a meeting of the IOC Speech Group on Auditory Modelling at RSRE, vol. 2, No. 7, 1987, 33 pages.

Ranzato et al. "Unsupervised learning of invariant feature hierarchies with applications to object recognition," IEEE conference on Computer Vision and Pattern Recognition, 2007, 9 pages.

Rickard et al. "The gini index of speech," In Proceedings of the 38th Conference on Information Science and Systems, 2004, pp. 5 pages.

Rippel et al., "Spectral Representations for Convolutional Neural Networks," Advances in Neural Information Processing Systems. 2015, 10 pages.

Sainath et al. "Learning filter banks within a deep neural network framework," IEEE workshop on Automatic Speech Recognition and Understanding, Dec. 2013, 6 pages.

Sainath et al., "Convolutional, Long Short-Term Memory, Fully Connected Deep Neural Networks," Acoustics, Speech and Signal Processing (ICASSP), 2015 IEEE International Conference on, pp. 4580-4584, Apr. 2015.

Sainath et al., "Deep Convolutional Neural Networks for LVCSR," Acoustics, Speech and Signal Processing (ICASSP), 2013 IEEE International Conference on, pp. 8614-8618, 2013.

Sainath et al., "Factored spatial and spectral multichannel raw waveform CLDNNs," 2016 IEEE International Conference on Acoustics, Speech and Signal Processing (ICASSP), IEEE, 2016, 5 pages.

Sainath et al., "Improvements to Deep Convolutional Neural Networks for LVCSR," In Automatic Speech Recognition and Understanding (ASRU), 2013 IEEE Workshop on, pp. 315-320, 2013.

Sainath et al., "Learning the Speech Front-end With Raw Waveform CLDNNs," Proc. Interspeech 2015, 5 pages.

Sainath et al., "Low-Rank Matrix Factorization for Deep Neural Network Training With IDGH-Dimensional Output Targets," 2013 IEEE International Conference on Acoustics, Speech and Signal Processing. IEEE, 2013, 5 pages.

Sainath et al., "Reducing the Computational Complexity of Multimicrophone Acoustic Models with Integrated Feature Extraction," Interspeech 2016, 2016, 1971-1975.

Sainath et al., "Speaker location and microphone spacing invariant acoustic modeling from raw multichannel waveforms," 2015 IEEE Workshop on Automatic Speech Recognition and Understanding (ASRU), IEEE, 2015, 7 pages.

Sainath. "Towards End-to-End Speech Recognition Using Deep Neural Networks," PowerPoint presentation, Deep Learning Workshop, ICML, Jul. 10, 2015, 51 pages.

Sak et al., "Long Short-Term Memory Based Recurrent Neural Network Architectures for Large Vocabulary Speech Recognition," arXiv:1402.1128v1 [cs.NE], Feb. 2014, 5 pages.

Sak et al., "Long Short-Term Memory Recurrent Neural Network Architectures for Large Scale Acoustic Modeling," in Proc. Interspeech, pp. 338-342, Sep. 2014.

Schluter et al., "Gammatone Features and Feature Combination for Large Vocabulary Speech Recognition," Acoustics, Speech and Signal Processing, 2007. ICASSP 2007. IEEE International Conference on, pp. IV-649-IV-652, Apr. 2007.

Sainath, Tara N., et al. "Factored spatial and spectral multichannel raw waveform CLDNNs." 2016 IEEE International Conference on Acoustics, Speech and Signal Processing (ICASSP). IEEE, Apr. 2016. (Year: 2016).

Xiao, Xiong, et al. "Deep beamforming networks for multi-channel speech recognition." 2016 IEEE International Conference on Acoustics, Speech and Signal Processing (ICASSP). IEEE, Apr. 2016. (Year: 2016).

Swietojanski, Pawel, Arnab Ghoshal, and Steve Renals. "Hybrid acoustic models for distant and multichannel large vocabulary speech recognition." 2013 IEEE Workshop on Automatic Speech Recognition and Understanding. IEEE, 2013. (Year: 2013).

Erdogan, Hakan, et al. "Multi-channel speech recognition: LSTMs all the way through." CHiME-4 workshop. 2016. (Year: 2016).

Sainath et al., "Deep convolutional neural networks for large-scale speech tasks." Neural Networks 64 (2015): 39-48.

Chan et al., "Listen, attend and spell: A neural network for large vocabulary conversational speech recognition," 2016 IEEE International Conference on Acoustics, Speech and Signal Processing (ICASSP) Mar. 2016, 16 pages.

Liao et al. "Large vocabulary automatic speech recognition for children," Sixteenth Annual Conference of the International Speech Communication Associates, Sep. 2015, 5 pages.

Xiao et al., "Deep Beamfonning Networks for Multi-Channel Speech Recognition," 2016 IEEE International Conference on Acoustics, Speech and Signal Processing (ICASSP), Mar. 2016, 5 pages.

eecs.ucmerced.edu [online] "Complex-valued Linear Layers for Deep Neural Network-based Acoustic Models for Speech Recognition," Izhak Shafran, Google Inc. Apr. 8, 2016 [retrieved on May 29, 2018] Retrieved from Internet: URL<<http://eecs.ucmerced.edu/sites/eecs.ucmerced.edu/files/page/documents/2016-04-08-slides.pdf> 54 pages.

slazebni.cs.illinois.edu [online presentation] "Recurrent Neural Network Architectures," Abhishek Narwekar, Anusri Pampari, CS 598: Deep Learning and Recognition, Fall 2016, [retrieved on May 29, 2018] Retrieved from Internet: URL<http://slazebni.cs.illinois.edu/spring17/1ec20_rnn.pdf>> 124 pages.

smerity.com [online] "Explaining and Illustrating orthogonal initialization for recurrent neural networks," Jun. 27, 2016, [retrieved on May 29, 2018] Retrieved from Internet: URL <https://smerity.com/articles/2016/orthogonal_init.html>> 8 pages.

"Chapter 4: Frequency Domain and Fourier Transforms" [retrieved on Nov. 11, 2016]. Retrieved from the Internet: URL<https://www.princeton.edu/~cuff/ele201/kulkarni_text/frequency.pdf>. 21 pages.

"Convolution theorem," from Wikipedia, the free encyclopedia, last modified on Jun. 26, 2016 [retrieved on Nov. 11, 2016]. Retrieved from the Internet: URL<<https://en.wikipedia.org/wiki/Convolution_theorem. 5 pages.

"Multiplying Signals" EECS2ON: Signals and Systems. UC Berkeley EECS Dept. [retrieved on Nov. 11, 2016]. Retrieved from the Internet: URL<http://ptolemy.eecs.berkeley.eecs20/week12/multiplying.html>. 1 page.

Aestern et al. "Spectro-temporal receptive fields of auditory neurons in the grassfrog," Biological Cybermetrics, Nov. 1980, 235-248.

Allen and Berkley, "Image method for efficiently simulating small-room acoustics," J. Acoust. Soc. Am. 65(4):943-950, Apr. 1979.

Anonymous. "Complex Linear Projection: An Alternative to Convolutional Neural Network," Submitted to the 29th Conference on Neural Information Processing Systems, Dec. 2015, 10 pages.

Arjovsky et al. "Unitary evolution recurrent neural networks," Proceedings of the 33rd International Conference on Machine Learning, Jun. 2016, 9 pages.

Arjowsky et al. "Unitary Evolution Recurrent Neural Networks," arXiv 1511.06464v4, May 25, 2016, 9 pages.

Bell et al. "An information-maximization approach to blind separation and blind deconvolution," Neural Computation, Nov. 1995, 7.6: 38 pages.

Bell et al. "Learning the higher-order structure of a natural sound," Network: Computation in Neural Systems, Jan. 1996, 7.2: 8 pages.

Benesty et al., "Microphone Array Signal Processing," Springer Topics in Signal Processing, 2008, 193 pages.

Bengio et al. "Scaling Learning Algorithms Towards AI," Large Scale Kernel Machines, Aug. 2007, 47 pages.

Biem et al. "A discriminative filter bank model for speech recognition," Eurospeech, Sep. 1995, 4 pages.

(56) References Cited

OTHER PUBLICATIONS

Brandstein and Ward, "Microphone Arrays: Signal Processing Techniques and Applications," Digital Signal Processing, 2001, 258 pages.

Burget et al. "Data driven design of filter bank for speech recognition," Text, Speech and Dialogue, 2001, 6 pages.

Burlick et al., "An Augmented Multi-Tiered Classifier for Instantaneous Multi-Modal Voice Activity Detection," Interspeech 2013, 5 pages, Aug. 20103.

Chen et al., "Compressing Convolutional Neural Networks in the Frequency Domain," arXiv preprint arXiv:1506.04449, 2015, 10 pages.

Chuangsuwanich and Glass, "Robust Voice Activity Detector for Real World Applications Using Harmonicity and Modulation frequency," Interspeech, pp. 2645-2648, Aug. 2011.

Davis and Mermelstein, "Comparison of Parametric Representations for Monosyllabic Word Recognition in Continuously Spoken Sentences," IEEE Transactions on Acoustics, Speech and Signal Processing, 28(4):357-366, Aug. 1980.

Dean et al., "Large Scale Distributed Deep Networks," Advances in Neural Information Processing Systems 25, pp. 1232-1240, 2012.

Delcroix et al., "Linear Prediction-Based Derevetheration With Advanced Speech Enhancement and Recognition Technologies for the Revell) Challenge," REVERB Workshop 2014, pp. 1-8, 2014.

Dettmers, Tim, "Understanding Convolution in Deep Learning." Mar. 26, 2015, [retrieved on Nov. 11, 2016]. Retrieved from the Internet: URL<http://timdettmers.com/2015/03/26/convolution-deep-learning/>. 77 pages.

Dieleman et al. "End-to-end learning for music audio," In Acoustics, Speech and Signal Processing (ICASSP), 2014, 5 pages.

Donoho. "Sparse components of images and optimal atomic decompositions," Constructive Approximation, 2001, 17(3): 26 pages.

Eyben et al., "Real-life voice activity detection with LSTM Recurrent Neural Networks and an application to Hollywood movies," 2013 IEEE International Conference on Acoustics, Speech and Signal Processing (ICASSP); May 2013, Institute of Electrical and Electronics Engineers, May 26, 2013, pp. 483-487, XP032509188.

Feng et al. "Geometric t p-norm feature pooling for image classification." IEEE Conference on Computer Vision and Pattern Recognition, 2011, 8 pages.

Ferroni et al., "Neural Networks Based Methods for Voice Activity Detection in a Multi-room Domestic Environment," Proc. of EVALITA as part of XIII AI*IA Symposium on Artificial Intelligence, vol. 2, pp. 153-158, 2014.

Field. "Relations between the statistics of natural images and the response properties of cortical cells," JOSA A 4.12 (1987): 16 pages.

Field. "What is the Goal of sensory coding?," Neural computation, 1994, 6.4: 44 pages.

Gabor. "Theory of communication Part 1: The analysis of information," Journal of the Institution of Electrical Engineers—Part III: Radio and Communication Engineering, 1946, 93.26, 29 pages.

Ghosh et al., "Robust Voice Activity Detection Using Long-Term Signal Variability," IEEE Transactions on Audio, Speech, and Language Processing, 19(3):600-613, Mar. 2011.

Giri et al., "Improving Speech Recognition in Reverberation Using a Room-Aware Deep Neural Network and Multi-Task Learning," 2015 IEEE International Conference on Acoustics, Speech and Signal Processing (ICASSP), pp. 5014-5018, Apr. 2015.

Glasberg and Moore, "Derivation of auditory filter shapes from notched-noise data," Hearing Research, vol. 47, No. 1, pp. 103-138, Aug. 1990.

Glorot and Bengio, "Understanding the difficulty of training deep feedforward neural networks," Proceedings of the International Conference on Artificial Intelligence and Statistics (AISTATS'10), pp. 249-256, 2010.

Golik et al. "Convolutional neural networks for acoustic modeling of raw time signal in lvcsr," Sixteen Annual Conference of the International Speech Communication Associates, 2015, 5 pages.

Graves et al., "Speech Recognition With Deep Recurrent Neural Networks," Acoustics, Speech and Signal Processing (ICASSP), 2013 IEEE International Conference on, pp. 6645-6649, 2013.

Hain et al., "Transcribing Meetings With the AMIDA Systems," IEEE Transactions on Audio, Speech, and Language Processing, 20(2):486-498, Feb. 2012.

Hastie et al. "Chapter 5: Basis Expansions and Regularization" The elements of statistical learning: data mining, inference and prediction, The Mathematical Intelligencer, 27(2), 2005, [retrieved on Jun. 15, 2018] Retrieved from Internet: URL<https://web.stanford.edu/~hastie/Papers/ESLII.pdf> 71 pages.

Heigold et al. "End-to-end text-dependent text dependent speaker verification," arXiv preprint arXiv, 2015, 1509.08062 5 pages.

Seltzer et al., "Likelihood-Mazimizing Beamforming for Robust Hands-Free Speech Recognition," IEEE Transactions on Speech and Audio Processing, 12(5):489-498, Sep. 2004.

Shafran et al. "Complex-valued Linear Layers for Deep Neural Network-based Acoustic Models for Speech Recognition," Apr. 8, 2016, [retrieved Feb. 26, 2018] Retrieved from Internet: URL<http://eecs.ucmerced.edu/sites/eecs.ucmerced.edu/files/page/documents/2016-04-08-slides.pdf> 54 pages.

Smith, Steven,—The Scientist and Engineer's Guide to Digital Signal Processing, Chapter 9: Applications of the DFT 1997, 4 pages.

Soltau et al., "The IBM Attila speech recognition toolkit," in Proc. IEEE Workshop on Spoken Language Technology, 2010, Dec. 2010, pp. 97-102.

Stolcke et al., "The SRI-ICSI Spring 2007 Meeting and Lecture Recognition System," Multimodal Technologies for Perception of Humans, vol. Lecture Notes in Computer Science, No. 2, pp. 450-463, 2008.

Swietojanski et al., "Hybrid Acoustic Models for Distant and Multichannel Large Vocabulary Speech Recognition," Automatic Speech Recognition and Understanding (ASRU), 2013 IEEE Workshop on. IEEE, Dec. 2013, pp. 285-290.

Thomas et al., "Analyzing convolutional neural networks for speech activity detection in mismatched acoustic conditions," 2014 IEEE International Conference on Acoustics, Speech and Signal Processing (ICASSP), IEEE, May 4, 2014, pp. 2519-2523, XP032617994.

Thomas et al., "Improvements to the IBM Speech Activity Detection System for the DARPA RATS Program," Proceedings of IEEE International Conference on Audio, Speech and Signal Processing (ICASSP), pp. 4500-4504, Apr. 2015.

Tuske et al., "Acoustic Modeling with Deep Neural Networks using Raw Time Signal for LVCSR," in Proc. Interspeech, Sep. 2014, pp. 890-894.

Van Veen and Buckley, "Beamforming: A Versatile Approach to Spatial Filtering," ASSP Magazine, IEEE, 5(2):4-24, Apr. 1988.

Varian et al. "Deep neural networks for small footprint text-dependent speaker verification," In Acoustics, Speech and Signal Processing, 2014, 5 pages.

Varian et al. "End-to-end training of acoustic models for large vocabulary continuous speech recognition with tensofflow," Interspeech, Aug. 2017, 5 pages.

Varian et al., "Complex Linear Projection (CLP): A Discriminative Approach to Joint Feature Extraction and Acoustic Modeling." submitted to Proc. ICML (2016), 5 pages.

Vasilache et al. "Fast convolutional nets with fbfft: A GPU performance evaluation," CoRR, 2014, abs/1412.7580, 17 pages.

Voice activity detection, from Wikipedia, the free encyclopedia, last modified on Jul. 23, 2015 [retrieved on Oct. 21, 2015]. Retrieved from the Internet: URL<http://en.wikipedia.org/wiki/Voice_activity_detection>, 5 pages.

Weiss and Kristjansson, "DySANA: Dynamic Speech and Noise Adaptation for Voice Activity Detection," Proc. of Interspeech 2008, pp. 127-130, 2008.

Wisdom et al. "Full-Capacity Unitary Recurrent Neural Networks," arXiv 1611.00035v1, Oct. 31, 2016, 9 pages.

Wisdom et al. "Full-Capacity Unitary Recurrent Neural Networks," Proceedings of Advances in Neural Information Processing Systems, Dec. 2016, 9 pages.

(56) References Cited

OTHER PUBLICATIONS

Yu et al. "Exploiting sparseness in deep neural networks for large vocabulary speech recognition," IEEE International Conference on Acoustics, Speech and Signal Processing, 2012, 4 pages.

Yu et al., "Feature Learning in Deep Neural Networks—Studies on Speech Recognition Tasks," arXiv:1301.3605v3 [cs.LG], pp. 1-9, Mar. 2013.

Zelinski, "A Microphone Array With Adaptive Post-Filtering for Noise Reduction in Reverberant Rooms," Acoustics, Speech, and Signal Processing, 1988. ICASSP-88., 1988 International Conference on, vol. 5, pp. 2578-2581, Apr. 1988.

Zhang and Wang, "Boosted Deep Neural Networks and Multi-resolution Cochleagram Features for Voice Activity Detection," Inierspeech 2014, pp. 1534-1538, Sep. 2014.

Zonoobi et al. "Gini index as sparsity measure for signal reconstruction from compressive samples," Selected Topics in Signal Processing, 2011, 5(5): 13 pages.

\* cited by examiner

ENHANCED MULTI-CHANNEL ACOUSTIC MODELS

CROSS-REFERENCE TO RELATED APPLICATIONS

This U.S. patent application is a continuation of, and claims priority under 35 U.S.C. § 120 from, U.S. patent application Ser. No. 16/278,830, filed on Feb. 19, 2019, which is a continuation of U.S. patent application Ser. No. 15/350,293, filed on Nov. 14, 2016, which claims priority under 35 U.S.C. § 119(e) to U.S. Provisional Application 62/384,461, filed on Sep. 7, 2016. The disclosures of these prior applications are considered part of the disclosure of this application and are hereby incorporated by reference in their entireties.

FIELD

The present specification is related to acoustic models, including acoustic models that process audio data from multiple microphones.

BACKGROUND

In general, speech recognition systems can use a neural network model that performs speech enhancement and acoustic modeling. Some systems process audio data from multiple microphones using a neural network.

SUMMARY

Multichannel neural network models may be trained to perform speech enhancement jointly with acoustic modeling. These models can process raw waveform input signals that are associated with multiple look directions. Although multi-channel models can provide improved accuracy compared to a single-channel model, use of current multi-channel models comes at a large cost in computational complexity. The computational complexity is related to the overall quantity of mathematical operations (e.g., multiplications used to carry out convolutions) that are used to perform time-domain signal processing.

This specification describes systems and methods for reducing the computational complexity of multi-channel acoustic models while maintaining appropriate accuracy. Computational complexity can be reduced by incorporating one or more optimizations that include minimizing the number of look directions, modifying certain parameters used in convolution operations (e.g., using an increased stride value) and utilizing frequency domain signal processing rather than time domain processes. For example, operations that typically require convolution in the time domain can be replaced with operations that perform element-wise multiplication (e.g., compute a dot product) of frequency domain data, which significantly reduces the amount of computation required. Application of the foregoing optimizations to current multi-channel models may reduce computational complexity of the models with little or no loss in accuracy. Also, because the structure of the acoustic model is altered to perform processing in the frequency domain, different parameters or filters can be learned compared to the model that uses time-domain convolution processing. For example, filters can be learned in the frequency domain during training of the model.

In general, one innovative aspect of the subject matter of this specification includes a computer-implemented method comprising, receiving, by a neural network of a speech recognition system, first data representing a first raw audio signal and second data representing a second raw audio signal, wherein the first raw audio signal and the second raw audio signal describe audio occurring at a same period of time, and generating, by a spatial filtering layer of the neural network, a spatial filtered output using the first data and the second data. The method also comprises, generating, by a spectral filtering layer of the neural network, a spectral filtered output using the spatial filtered output, wherein generating the spectral filtered output comprises processing frequency-domain data representing the spatial filtered output, and processing, by one or more additional layers of the neural network, the spectral filtered output to predict sub-word units encoded in both the first raw audio signal and the second raw audio signal.

Other implementations of this and other aspects include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

Implementations may include one or more of the following features. For instance, the method can further include causing a device to perform an action using the predicted sub-word units in response to processing, by the additional layers of the neural network, the spectral filtered output. In some implementations, generating, by the spectral filtering layer of the neural network, a spectral filtered output using the spatial filtered output comprises: generating filtered data by using an element-wise multiplication of (i) the frequency-domain data representing the spatial filtered output with (ii) frequency-domain representations of multiple filters. In some implementations, generating, by the spectral filtering layer of the neural network, the spectral filtered output using the spatial filtered output comprises: performing a complex linear projection (CLP) of the filtered data in the frequency domain to generate a CLP output; and applying an absolute-value function and a log compression to the CLP output.

In some implementations, generating, by the spectral filtering layer of the neural network, the spectral filtered output using the spatial filtered output comprises: performing a linear projection of energy using the filtered data. In some implementations, performing the linear projection of energy using the filtered data comprises: determining an energy value for each of multiple time-frequency bins; applying a power compression to the energy values to generate compressed energy values; and linearly projecting the compressed energy values using filters with learned filter parameters.

In some implementations, generating, by the spatial filtering layer of the neural network, a spatial filtered output using the first data and the second data comprises: performing element-wise multiplications of frequency-domain representations of the first data and the second data with frequency domain representations of filters learned through training of the neural network. In some implementations, generating, by the spatial filtering layer of the neural network, a spatial filtered output using the first data and the second data comprises: performing a fast Fourier transform on the first data to obtain a first frequency-domain representation of the first data; performing a fast Fourier transform on the second data to obtain a second frequency-domain representation of the second data; performing an element-wise multiplication of the first frequency-domain representation with a frequency-domain representation of a first set of filters; and performing an element-wise multiplication of the second frequency-domain representation with a frequency-domain representation of a second set of filters.

In some implementations, generating, by the spatial filtering layer of the neural network, the spatial filtered output using the first data and the second data comprises: filtering the first data and the second data using time convolution filters; and summing the outputs of the time convolution filters. In some implementations, the time convolution filters are finite impulse response filters, each finite response filter being trained with a separate set of parameters. In another aspect, the time convolution filters comprise multiple filter pairs, each filter pair comprising a first filter and a second filter; wherein filtering the first data and the second data comprises, for each of the multiple filter pairs: convolving the first data with the first filter of the filter pair to generate a first time convolution output for the filter pair; and convolving the second data with the second filter of the filter pair to generate a first time convolution output for the filter pair; wherein summing the outputs of the time convolution filters comprises generating, for each pair of filters, a sum of the first time convolution output for the filter pair and the second time convolution output for the filter pair.

In some implementations, the time convolution filters comprise a set of filters that have been trained jointly, wherein training the filters causes pairs of the filters to pass audio originating from different spatial directions. In some implementations, the spatial filtering layer of the neural network performs both spatial filtering and spectral filtering. In some implementations, generating, by the spatial filtering layer of the neural network, the spatial filtered output using the first data and the second data comprises filtering the first data and the second data using multiple finite impulse response filters.

In some implementations, generating, by the spatial filtering layer of the neural network, the spatial filtered output using the first data and the second data comprises: generating a first quantity of first samples from the first data; generating a second quantity of second samples from the second data, the second quantity and the first quantity being the same quantity; striding by a number of samples greater than one in time across the first samples to generate first spatial output; and striding by a number of samples greater than one in time across the second samples to generate second spatial output.

In some implementations, striding by a number of samples greater than one in time across the first samples to generate the first spatial output comprises striding by at least four samples in time across the first samples to generate first spatial output; wherein striding by a number of samples greater than one in time across the second samples to generate the second spatial output comprises striding by at least four samples in time across the second samples to generate the second spatial output. In some implementations, generating, by the spatial filtering layer of the neural network, the spatial filtered output using the first data and the second data comprises: summing first values in the first spatial output with corresponding values in the second spatial output to generate an output feature map, wherein the spatial filtered output comprises the output feature map.

In some implementations, processing, by the one or more additional layers of the neural network, the spectral filtered output to predict sub-word units encoded in both the first raw audio signal and the second raw audio signal comprises: processing, by a long short-term memory deep neural network included of the neural network, the spectral filtered output to predict sub-word units encoded in both the first raw audio signal and the second raw audio signal.

In general, another innovative aspect of the subject matter of this specification includes one or more non-transitory computer-readable media storing instructions that, when executed by one or more computers, cause the one or more computers to perform operations comprising: receiving, by a neural network of a speech recognition system, first data representing a first raw audio signal and second data representing a second raw audio signal, wherein the first raw audio signal and the second raw audio signal describe audio occurring at a same period of time. The performed operations comprise, generating, by a spatial filtering layer of the neural network, a spatial filtered output using the first data and the second data, and generating, by a spectral filtering layer of the neural network, a spectral filtered output using the spatial filtered output, wherein generating the spectral filtered output comprises processing frequency-domain data representing the spatial filtered output. The performed operations also comprise, processing, by one or more additional layers of the neural network, the spectral filtered output to predict sub-word units encoded in both the first raw audio signal and the second raw audio signal.

In general, another innovative aspect of the subject matter of this specification includes a system comprising, one or more computers; and one or more computer-readable storage devices storing instructions that, when executed by the one or more computers, cause the one or more computers to perform operations comprising: receiving, by a neural network of a speech recognition system, first data representing a first raw audio signal and second data representing a second raw audio signal, wherein the first raw audio signal and the second raw audio signal describe audio occurring at a same period of time. The performed operations further comprise, generating, by a spatial filtering layer of the neural network, a spatial filtered output using the first data and the second data, and generating, by a spectral filtering layer of the neural network, a spectral filtered output using the spatial filtered output, wherein generating the spectral filtered output comprises processing frequency-domain data representing the spatial filtered output. The performed operations also comprise, processing, by one or more additional layers of the neural network, the spectral filtered output to predict sub-word units encoded in both the first raw audio signal and the second raw audio signal.

The subject matter described in this specification can be implemented in particular embodiments and may result in one or more of the following advantages. In some implementations, a speech recognition system that uses a neural network as described below may have a reduced word error rate. In some implementations, a speech recognition system may use multi-task learning during a neural network learning process to enhance a received signal, suppress noise, improve the learning process, or a combination of two or more of these. In some implementations, a speech recognition system may use a spatial filtering layer and a separate spectral filtering layer to design the spatial filtering layer to be spatially selective, while implementing a frequency decomposition shared across all spectral filters in the spectral filtering layer. In some implementations, a spectral filtering layer can learn a decomposition with better frequency resolution than a spatial filtering layer, may be incapable of doing any spatial filtering, or both. In some implementations, a speech recognition system may use multi-task learning to de-noise and de-reverberate features from an audio signal while classifying the features.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

In some implementations, a speech recognition system includes a neural network, e.g., a convolutional long short-term memory deep neural network (CLDNN), with a spatial filtering convolutional layer and a spectral filtering convolutional layer to process audio signals, e.g., raw audio signals. The neural network may include the two convolutional layers to process multichannel input, e.g., multiple audio signals from different microphones when each audio signal represents sound from the same period of time. The speech recognition system may use the multichannel input to enhance a representation of words spoken by a user, and encoded in the audio signals, compared to other sound, e.g., noise, encoded in an audio signal, and to reduce a word error rate.

In some implementations, the neural network may use multi-task learning during a learning process. For example, the neural network may include two different architectures each with one or more deep neural network layers after a long short-term memory layer and the two convolutional layers to process "clean" and "noisy" audio signals that encode the same words or sub-word units. The neural network may include a particular layer or group of layers in both architectures such that the particular layers are trained during processing of both the "clean" and the "noisy" audio signals while other layers are trained during processing of only a single type of audio signal, either clean or noisy but not both.

For instance, the neural network processes the "clean" audio signal using the deep neural network layers and the "noisy" audio signal using other neural network layers, e.g., two long short-term memory layers and a different deep neural network layer, to determine two output values, one for each of the audio signals. The neural network determines a difference between the errors of the two output values, or between the gradients for the two output values, and uses the difference to determine a final gradient for a training process. The neural network uses the final gradient during backward propagation.

Figure 1:
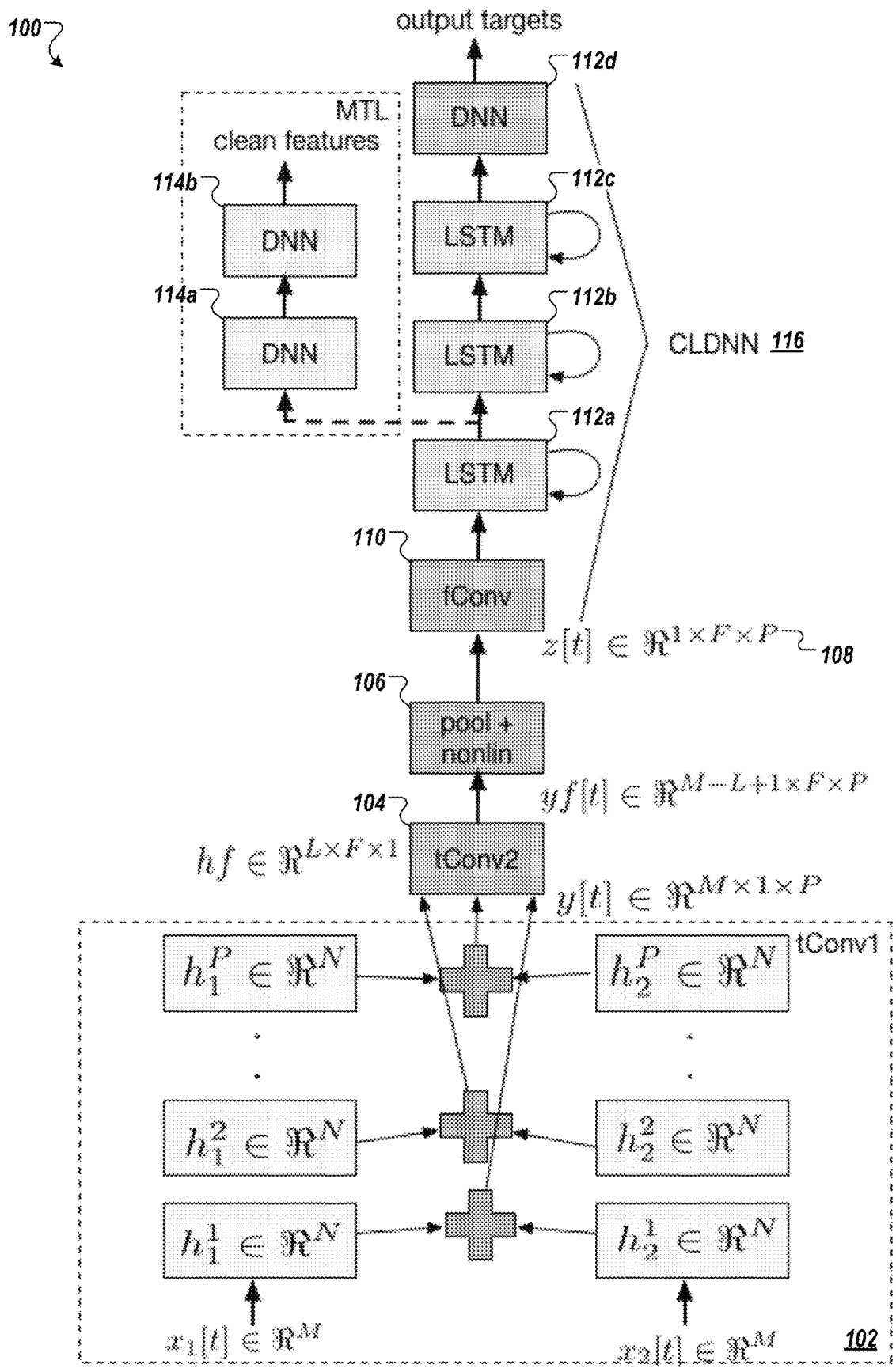
FIG. 1 is an example of a multichannel speech recognition system that includes a multichannel spatial filtering convolutional layer and a separate spectral filtering convolutional layer as part of a single neural network.

FIG. 1 is an example of a multichannel speech recognition system 100 that includes a multichannel spatial filtering convolutional layer 102 and a separate spectral filtering convolutional layer 104 as part of a single neural network. The multichannel spatial filtering convolutional layer 102 generates a spatial filtered output from multichannel audio input, e.g., two or more audio signals when each audio signal is created by a different microphone for the same period of time. The multichannel spatial filtering convolutional layer 102 may include short-duration multichannel time convolution filters which map multichannel inputs down to a single channel. During training, the multichannel spatial filtering convolutional layer 102 learns several filters, each of which are used to "look" in different directions in space for a location of a speaker of a word or sub-word unit encoded in the audio signals.

The spectral filtering convolutional layer 104 receives the spatial filtered output, e.g., the single channel output from each of the filters in the spatial filtering convolutional layer 102. The spectral filtering convolutional layer 104 may have a longer-duration time convolution, compared to the spatial filtering convolutional layer 102, and may perform finer frequency resolution spectral decomposition, e.g., analogous to a time-domain auditory filterbank.

The spectral filtering convolutional layer 104 applies a pooling function and a rectified non-linearity function, using layer 106, to the spatial filtered output to generate a spectral filtered output 108. The spectral filtering convolutional layer 104 provides the spectral filtered output 108 to a frequency convolutional layer 110. The frequency convolutional layer 110 processes the spectral filtered output 108 and provides a frequency convoluted output to another layer in the multichannel speech recognition system 100, e.g., a long short term memory (LSTM) layer 112a.

For example, the multichannel spatial filtering convolutional layer 102 may receive two channels of audio signals, $x_1[t]$ and $x_2[t]$. The multichannel spatial filtering convolutional layer 102 receives each of the channels from a respective microphone c at time t. In some examples, the multichannel spatial filtering convolutional layer 102 receives more than two channels. For filters $p \in P$, $h_c^p[n]$ is the nth tap of the filter p associated with microphone c. The output $y^p[t]$ of filter $p \in P$ is defined by Equation (1) below for C microphones when N is the order, or size, of the finite impulse response (FIR) filters.

$$y^p[t] = \sum_{k=0}^{C-1} \sum_{n=0}^{N-1} h_c^p[n] x_c[t-n] \tag{1}$$

The multichannel spatial filtering convolutional layer 102 may model Equation (1) and perform a multichannel time-convolution with a FIR spatial filterbank. For instance, the multichannel speech recognition system 100 may select a window of a raw audio signal of length M samples for each channel C, denoted as $\{x_1[t], x_2[t], \ldots, x_C[t]\}$ for $t \in 1, \ldots, M$. The multichannel spatial filtering convolutional layer 102 convolves each channel c for each of the samples $x_C[t]$ by a filter $p \in P$ with an order of N, for a total of P filters $h_c = \{h_c^1, h_c^2, \ldots h_c^P\}$. In some examples, the multichannel spatial filtering convolutional layer 102 has two or more, e.g., ten, spatial filters. In some examples, the multichannel spatial filtering convolutional layer 102 has more than ten spatial filters.

The multichannel spatial filtering convolutional layer 102 strides by one in time across M samples and performs a "full" convolution, such that the output, e.g., each feature maps, for each filter $p \in P$ remains length M, e.g., the length of each filter map for the multichannel spatial filtering convolutional layer 102 is the same as the length of the input. The multichannel spatial filtering convolutional layer 102 sums the outputs from each channel $c \in C$ to create an output feature map of size $y^p[t] \in R^{M \times 1 \times P}$. Dimension M corresponds to time, e.g., sample index, dimension 1 corresponds to frequency, e.g., spatial filter index, and dimension P corresponds to look direction, e.g., feature map index.

The spectral filtering convolutional layer 104 includes longer-duration filters than the multichannel spatial filtering convolutional layer 102. The filters in the spectral filtering convolutional layer 104 are single-channel filters. The spectral filtering convolutional layer 104 receives the P feature maps from the multichannel spatial filtering convolutional layer 102 and performs time convolution on each of the P feature maps. The spectral filtering convolutional layer 104 may use the same time convolution across all P feature maps. The spectral filtering convolutional layer 104 includes filters $g \in R^{L \times F \times 1}$, where 1 indicates sharing across the P input feature maps, e.g., sharing of the same time convolution. The spectral filtering convolutional layer 104 produces an output $w[t] \in R^{M-L+1 \times F \times P}$ such that $w[t] = yf[t]$ as shown in FIG. 1.

The multichannel speech recognition system 100 pools the filterbank output w[t] in time, e.g., to discard short-time information, over the entire time length of the output signal w[t], to produce an output with dimensions $1 \times F \times P$. The multichannel speech recognition system 100 applies a rectified non-linearity to the pooled output, and may apply a stabilized logarithm compression, to produce a frame-level feature vector z[t] at time t, e.g., $z[t] \in R^{1 \times F \times P}$. For instance the spectral filtering convolutional layer 104 includes a pooling and non-linearity layer 106 that pools the output, e.g., to discard short-time phase information, and applies the rectified non-linearity.

In some implementations, the multichannel speech recognition system 100, as part of the stabilized logarithm compression, may use a small additive offset to truncate the output range and avoid numerical problems with very small inputs. For instance, the multichannel speech recognition system 100 may apply $\log(\cdot + 0.01)$ to the pooled output when producing the frame-level feature vector z[t].

The multichannel speech recognition system 100 may shift a window along the raw audio signal, e.g., by a small frame hop such as 10 milliseconds, and repeat the time convolution to produce a set of time-frequency-direction frames, e.g., at 10 millisecond intervals. For example, the multichannel speech recognition system 100 may process another audio signal using the multichannel spatial filtering convolutional layer 102 and the spectral filtering convolutional layer 104.

The output out of the spectral filtering convolutional layer 104 produces a frame-level feature, denoted as $z[t] \in R^{1 \times F \times P}$. In some examples, the output z[t] of the spectral filtering convolutional layer 104, e.g., the combined output of the multichannel spatial filtering convolutional layer 104, including the layer 106, and the spectral filtering convolutional layer 102, is the Cartesian product of all spatial and spectral filters.

The multichannel speech recognition system 100 may provide the output z[t] to a convolutional long short-term memory deep neural network (CLDNN) block 116 in the CLDNN. The CLDNN block 116 includes a frequency convolutional layer 110 that applies a frequency convolution to z[t]. The frequency convolutional layer 110 may have two-hundred fifty-six filters of size $1 \times 8 \times 1$ in time-frequency-direction. The frequency convolutional layer 110 may use pooling, e.g., non-overlapping max pooling, along the frequency axis. The frequency convolutional layer may use a pooling size of three.

The multichannel speech recognition system 100 may provide the output of the frequency convolution layer 110 to a linear low-rank projection layer (not shown) to reduce dimensionality. The multichannel speech recognition system 100 may provide the output of the linear low-rank projection layer, or the output of the frequency convolution layer 110, to three long-short term memory (LSTM) layers 112a-c. Each of the three LSTM layers 112a-c may have eight-hundred and thirty-two cells and a five-hundred and twelve unit projection layer. The multichannel speech recognition system 100 provides the output of the three LSTM layers 112a-c to a deep neural network (DNN) layer 112d to predict context-dependent states, e.g., words or sub-word units encoded in the input audio signal. The DNN layer may have 1,024 hidden units.

In some implementations, the multichannel speech recognition system 100 trains the multichannel spatial filtering convolutional layer 102 and the spectral filtering convolutional layer 104 jointly with the rest of the CLDNN, e.g., the with layer 110 and layers 112a-d in the CLDNN block 116. During training, the multichannel speech recognition system 100 may unroll the raw audio signal CLDNN for twenty time steps for training with truncated backpropagation through time. In some examples, the multichannel speech recognition system 100 may delay the output state label by five frames, e.g., to use information about future frames to improve prediction of the current frame. For example, each of the three LSTM layers 112a-c may include information about the five most recently processed frames when processing a current frame.

In some implementations, the multichannel speech recognition system 100 may have two outputs during a training process. The first output may predict context-dependent states, e.g., from a noisy audio signal, and the second output may predict clean log-mel features, e.g., from a clean audio signal that encodes the same words or sub-word units as the noisy audio signal. The multichannel speech recognition system 100 may determine gradients from the layers used to generate each of the two outputs during a backward propagation process. The multichannel speech recognition system 100 may combine the multiple gradients using weights. In some examples, the multichannel speech recognition system 100 may use a multi-task learning (MTL) process during the training to generate the two outputs.

For example, the multichannel speech recognition system 100 may use the output that predicts the clean log-mel features during training, and not during run-time, to regularize network parameters. The multichannel speech recognition system 100 may include one or more denoising layers, e.g., layers 112b-d shown in FIG. 1, and an MTL module, e.g., that includes two deep neural network (DNN) layers 114a-b. In some examples, the MTL module includes a linear low-rank layer after the two DNN layers 114a-b to predict clean log-mel features. In some examples, the multichannel speech recognition system 100 does not predict the clean audio signal, e.g., the words or sub-word units encoded in the clean audio signal, and only predicts log-mel features for the clean audio signal.

The multichannel speech recognition system 100 uses the denoising layers to process noisy audio signals and the MTL module to process clean audio signals. When processing a noisy audio signal, the multichannel speech recognition system 100 uses the denoising layers and does not use the MTL module. When processing a clean audio signal, the multichannel speech recognition system 100 uses the MTL module and does not use the denoising layers, or does not use at least one of the denoising layers depending on a location at which the MTL module is placed in the CLDNN. For instance, when the MTL module is after a first LSTM layer 112a, the multichannel speech recognition system 100 uses the first LSTM layer 112a and the MTL module to process a clean audio signal and does not use the two LSTM layers 112b-c or the DNN layer 112d. When the MTL module is after a second LSTM layer 112b, the multichannel speech recognition system 100 uses the first two LSTM layers 112a-b and the MTL module to process a clean audio signal and does not use the last LSTM layer 112c or the DNN layer 112d.

During training the multichannel speech recognition system 100 back-propagates the gradients from the context-dependent states and MTL outputs by weighting the gradients by α and 1−α, respectively. For instance, the multichannel speech recognition system 100 may receive a first clean audio signal and a second noisy audio signal that is a "corrupted" version of the first clean audio signal, e.g., to which reverberation, noise, or both, have been added to the underlying clean speech features from the first clean audio signal. The multichannel speech recognition system 100 may process, during a single training iteration, both the first clean audio signal and the second noisy audio signal, determine outputs for both audio signals, and then gradients for the multichannel speech recognition system 100 using the outputs for both audio signals, e.g., using respective errors for the outputs. The gradient for the MTL output, e.g., the first clean audio signal, may affect only the layers in the MTL module and not the denoising layers which are not used to process the first clean audio signal. The gradient for the denoising layers, e.g., the second noisy audio signal, may affect only the CLDNN and not the layers in the MTL module.

In some examples, the multichannel speech recognition system 100 may minimize the squared error between the observed features that are corrupted by reverberation and noise, e.g., in the second noisy audio signal, and the underlying clean speech features, e.g., in the first clean audio signal. For instance, if v represents the observed reverberant and noisy speech feature vectors and w represents the underlying clean speech feature vectors, e.g., $\hat{w}_t$ represents the clean features from the clean audio signal and $w_t$ represents the clean features from the noisy audio signal, the MTL objective function used to train this model may be defined by Equation (2) below.

$$T = \alpha \Sigma_t p(s|v_t) + (1-\alpha) \Sigma_t (\hat{w}_t - w_t)^2 \quad (2)$$

In Equation (2), the first term $p(s|v_t)$ is the primary cross entropy task, e.g., the clean log-mel features determined using the multi-task module, and the second term $(\hat{w}_t - w_t)^2$ is the secondary feature enhancement task, e.g., the context dependent states determined using the denoising layers, and α is the weight parameter which determines how much importance the secondary task should get. In some examples, more weight is given to the first term (cross entropy) compared to the second term (secondary feature enhancement). For instance, α may be 0.9.

In some implementations, during training, the multichannel speech recognition system 100 computes the baseline, e.g., clean, log-mel features with a 25 millisecond window and a 10 millisecond hop. The multichannel speech recognition system 100 may compute raw audio signal features, e.g., noisy audio signal features, with a filter size N of twenty-five milliseconds, or N=four-hundred at a sampling rate of 16 kHz. In some examples, when the input window size is thirty-five millisecond (M=560), the multichannel speech recognition system 100 has a ten millisecond overlapping pooling window.

In some implementations, the multichannel speech recognition system 100 is trained using data from different microphone array geometries. For example, the multichannel speech recognition system 100 may use audio signals received from two microphones spaced fourteen centimeters apart, two microphones spaced ten centimeters apart, three microphones each spaced fourteen centimeters apart, a configuration of four microphones, and other microphone geometries. In some examples, the multichannel speech recognition system 100 is trained with the cross-entropy (CE) criterion, using asynchronous stochastic gradient descent (ASGD) optimization, e.g., all layers in the MTL module and the denoising layers are trained with CE criterion, using ASGD optimization. In some examples, all networks have 13,522 context-dependent output targets. In some examples, the weights of all LSTM layers are randomly initialized using a uniform distribution between −0.02 and 0.02. In some examples, the multichannel speech recognition system 100 may use an exponentially decaying learning rate, initialized to 0.004 and decaying by 0.1 over 15 billion frames.

In some implementations, the multichannel speech recognition system 100 learns filter parameters. For example, the multichannel speech recognition system 100 may learn filter parameters for the multichannel spatial filtering convolutional layer 102. In some examples, training of the filter parameters for the multichannel spatial filtering convolutional layer 102 may allow the multichannel spatial filtering convolutional layer 102 to perform some spectral decomposition.

In some implementations, the output of the multichannel spatial filtering convolutional layer 102 is not directly processed by a non-linear compression, e.g., a rectifier or a log function. For instance, the output of the multichannel spatial filtering convolutional layer 102 may go through other processing to generate intermediate data that is processed by a non-linear compression. In some implementations, the output of the multichannel spatial filtering convolutional layer 102 is not pooled. For instance, the output of the multichannel spatial filtering convolutional layer 102 may go through other processing to generate intermediate data that is pooled.

Figure 2:
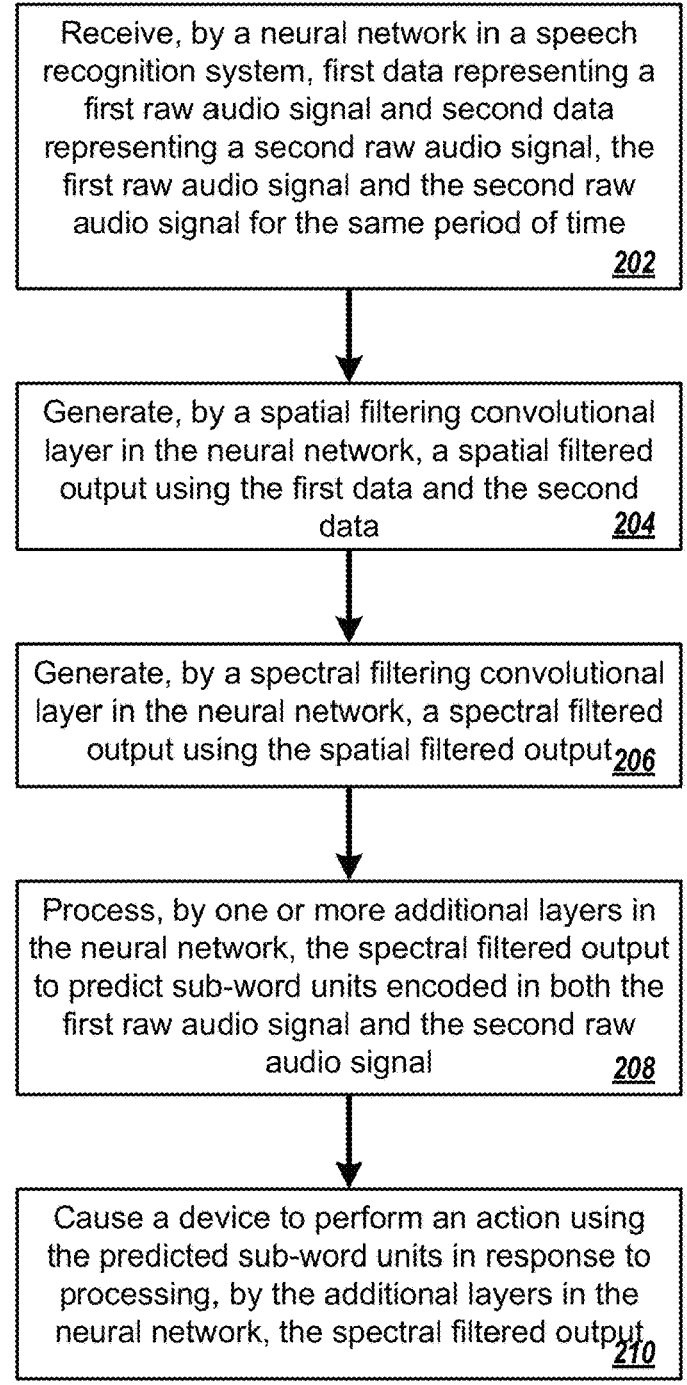
FIG. 2 is a flow diagram of a process for predicting a sub-word unit encoded in two raw audio signals for the same period of time.

FIG. 2 is a flow diagram of a process 200 for predicting a sub-word unit encoded in two raw audio signals for the same period of time. For example, the process 200 can be used by the multichannel speech recognition system 100.

A neural network in a speech recognition system receives first data representing a first raw audio signal and second data representing a second raw audio signal, the first raw audio signal and the second raw audio signal for the same period of time (202). For instance, a device that includes the neural network generates the first data and the second data.

The device may include one or more microphones that each generate one of the first data and the second data.

A spatial filtering convolutional layer in the neural network generates a spatial filtered output using the first data and the second data (204). For example, the spatial filtering convolutional layer filters the first data and the second data using multiple finite impulse response filters. The spatial filtering convolutional layer may generate samples from the first data and the second data and stride across the samples in time to generate the spatial filtered output. The spatial filtering convolutional layer may filter the first data and the second data using short-duration multichannel time convolution filters which map multichannel inputs to a single channel. In some implementations, the spatial filtering convolutional layer receives data representing three or more raw audio signals for the same period of time.

A spectral filtering convolutional layer in the neural network generates a spectral filtered output using the spatial filtered output (206). The spectral filtering convolutional layer may generate the spectral filtered output using a second time convolution with a second duration longer than a first duration of the first time convolution used by the spatial filtering convolutional layer. The spectral filtered convolutional layer may pool the spatial filtered output in time, e.g., using non-overlapping max pooling with a pooling size of three. The spectral filtered convolutional layer may apply a rectified non-linearity to the pooled output.

One or more additional layers in the neural network process the spectral filtered output to predict sub-word units encoded in both the first raw audio signal and the second raw audio signal (208). For instance, one or more long short-term memory layers, e.g., three long short-term memory layers, and a deep neural network layer may process the spectral filtered output. The deep neural network may generate a prediction about a sub-word unit encoded in both of the raw audio signals. In some implementations, the deep neural network may generate a prediction about a word encoded in both of the raw audio signals.

The neural network causes a device to perform an action using the predicted sub-word units in response to processing, by the additional layers in the neural network, the spectral filtered output (210). For example, the neural network provides the predicted words or sub-word units to an application that analyzes the words or sub-word units to determine whether the raw audio signals encoded a command, such as a command for an application or device to launch another application or perform a task associated with an application. In some examples, the neural network may combine multiple sub-word units to generate words and provide the generated words, or data representing the words, to the application.

In some implementations, the process 200 can include additional steps, fewer steps, or some of the steps can be divided into multiple steps. For example, the neural network may perform steps 202 through 208 without performing step 210.

Figure 3:
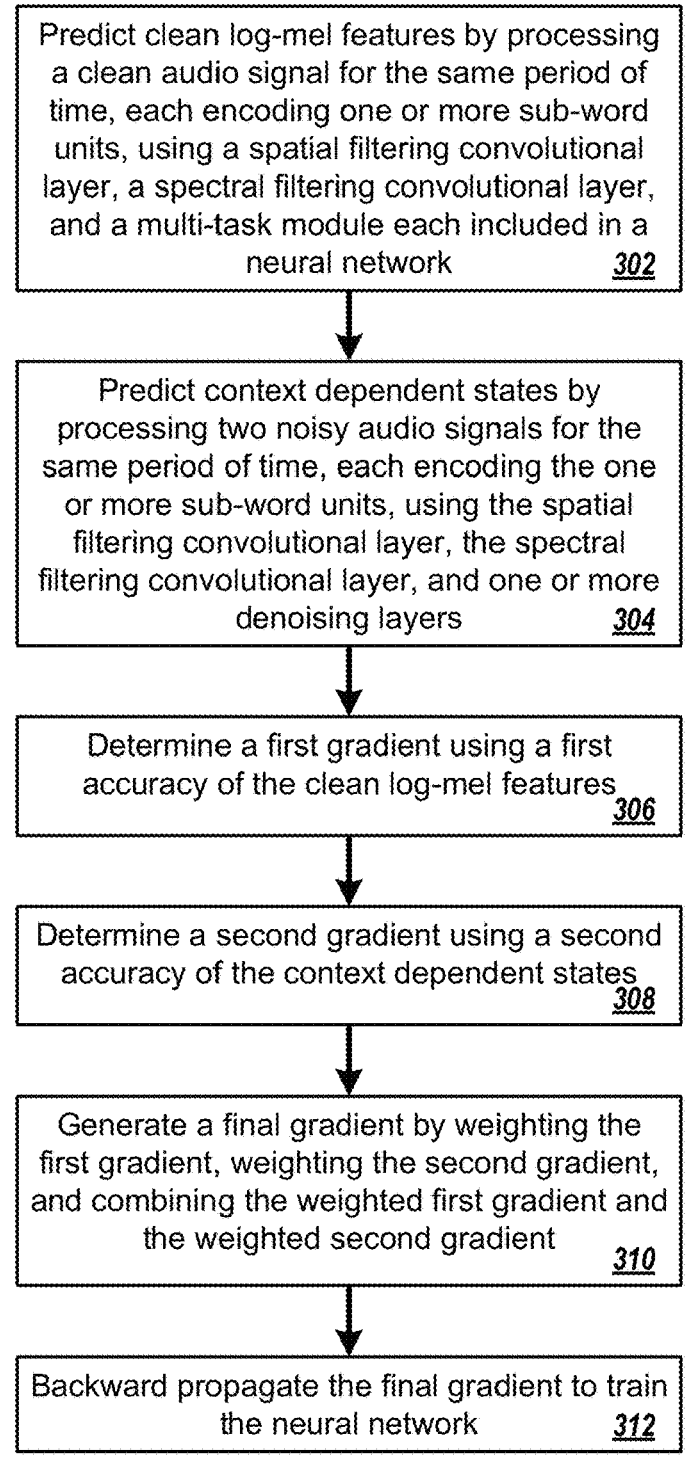
FIG. 3 is a flow diagram of a process for training a neural network that includes a spatial filtering convolutional layer and a spectral filtering convolutional layer.

FIG. 3 is a flow diagram of a process 300 for training a neural network that includes a spatial filtering convolutional layer and a spectral filtering convolutional layer. For example, the process 300 can be used by the multichannel speech recognition system 100.

A system predicts clean log-mel features by processing two clean audio signals for the same period of time, each encoding one or more sub-word units, using a spatial filtering convolutional layer, a spectral filtering convolutional layer, and a multi-task module each included in a neural network (302). For example, a neural network may use the spatial filtering convolutional layer, the spectral filtering convolutional layer, and the multi-task module, e.g., one or more long short-term memory layers and a deep neural network layer, to predict the clean log-mel features. The neural network may receive the raw, clean audio signals and pass the raw, clean audio signals to the spatial filtering convolutional layer to generate spatial filtered output. The neural network may provide the spatial filtered output to the spectral filtering convolutional layer to generate spectral filtered output. The neural network may provide the spectral filtered output to the multi-task module to generate the clean log-mel features.

The raw, clean audio signal does not include noise, e.g., background noise, or noise above a threshold level. The system may receive the two raw, clean audio signals from a single device, e.g., which generated the signals using two microphones, each of which generated one of the raw, clean audio signals. In some examples, the system may retrieve the raw, clean audio signals from a memory when the two raw, clean audio signals were previously generated from two microphones to represent a stereo audio signal. The two raw, clean audio signals may be generated using any appropriate method to create stereo audio signals.

A system predicts context dependent states by processing two noisy audio signals for the same period of time, each encoding the one or more sub-word units, using the spatial filtering convolutional layer, the spectral filtering convolutional layer, and one or more denoising layers (304). For instance, the neural network uses the spatial filtering convolutional layer, the spectral filtering convolutional layer, and the denoising layers to predict the context dependent states. The neural network may receive a raw, noisy audio signal and pass the raw, noisy audio signal to the spatial filtering convolutional layer to generate spatial filtered output. The neural network may provide the spatial filtered output to the spectral filtering convolutional layer to generate spectral filtered output. The neural network may provide the spectral filtered output to the denoising layers, e.g., one or more deep neural network layers different than the deep neural network layer that processed the raw, clean audio signal. The denoising layers may generate a prediction of the context dependent states for the raw, noisy audio signal using the spectral filtered output. The system may generate the raw, noisy audio signal from the raw, clean audio signal by adding noise to the raw, clean audio signal, e.g., by adding noise above the threshold level to the raw, clean audio signal.

A system determines a first gradient using a first accuracy of the clean log-mel features (306). For example, the system compares the predicted clean log-mel features (determined using step 302) with expected log-mel features to determine the first accuracy. The system may use any appropriate method to determine the first gradient, the first accuracy, or both. In some examples, the system may select a gradient to minimize the error between the predicted clean log-mel features and the expected log-mel features.

A system determines a second gradient using a second accuracy of the context dependent states (308). For instance, the system compares the predicted context dependent states (determined using step 304) with expected context dependent states to determine the second accuracy. The system may use any appropriate method to determine the second gradient, the second accuracy, or both. In some examples, the system may select a gradient to minimize the error between the predicted context dependent states and the expected context dependent states.

A system generates a final gradient by weighting the first gradient, weighting the second gradient, and combining the weighted first gradient and the weighted second gradient (310). The system may determine weights for each of the first gradient and the second gradient using an importance of the corresponding task. In some examples, the system may use Equation (2) above to weight the first gradient and the second gradient.

A system backward propagates the final gradient to train the neural network (312). For instance, the system uses gradient descent with the final gradient to train the neural network.

The order of steps in the process 300 described above is illustrative only, and the training of the neural network can be performed in different orders. For example, the system may predict the context dependent states and then predict the clean log-mel features. The system may determine the second gradient and then determine the first gradient. In some examples, the system may predict the clean log-mel features and then determine the first gradient before predicting the content dependent states. In some implementations, the system may predict the context dependent states and determine the second gradient and then predict the clean log-mel features.

In some implementations, the process 300 can include additional steps, fewer steps, or some of the steps can be divided into multiple steps. For example, the system may provide the neural network, e.g., the spatial filtering convolutional layer, the spectral filtering convolutional layer, and the multi-task module, to a device for predicting sub-word units or words encoded in both a first raw audio signal and a second raw audio signal for the same period of time. In some examples, the device may predict words encoded in multiple raw audio signals. The device may predict words encoded in three or more raw audio signals.

In some implementations, one or more servers may train the neural network. Once the neural network is trained, at least one of the servers may provide the neural network to a device, e.g., a user device, for use predicting words or sub-word units included in multiple raw audio signals.

In some implementations, a single device may train and use the neural network to predict the words or sub-word units. In some implementations, a first device may train the neural network and provide the neural network to a second, different device, for use.

In general, the techniques discussed with respect to FIGS. 1-3 can be embodied in methods that include the actions of receiving, by a neural network in a speech recognition system, first data representing a first raw audio signal and second data representing a second raw audio signal, the first raw audio signal and the second raw audio signal for the same period of time, generating, by a spatial filtering convolutional layer in the neural network, a spatial filtered output the first data and the second data, generating, by a spectral filtering convolutional layer in the neural network, a spectral filtered output using the spatial filtered output, and processing, by one or more additional layers in the neural network, the spectral filtered output to predict sub-word units encoded in both the first raw audio signal and the second raw audio signal.

In general, another innovative aspect can be embodied in methods that include the actions of training, by a speech recognition system, a neural network that includes a spatial filtering convolutional layer and a spectral filtering convolutional layer by: predicting clean log-mel features by processing two clean audio signals for the same period of time, each encoding one or more sub-word units, using the spatial filtering convolutional layer, the spectral filtering convolutional layer, and a multi-task module, predicting context dependent states by processing a noisy audio signal encoding the one or more sub-word units using the spatial filtering convolutional layer, the spectral filtering convolutional layer, and one or more denoising layers, determining a first gradient using a first accuracy of the clean log-mel features, determining a second gradient using a second accuracy of the context dependent states, generating a final gradient by weighting the first gradient and weighting the second gradient and combining the weighted first gradient and the weighted second gradient, and backward propagating the final gradient to train the neural network.

The foregoing and other embodiments can each optionally include one or more of the following features, alone or in combination. The method may include causing a device to perform an action using the predicted sub-word units in response to processing, by the additional layers in the neural network, the spectral filtered output.

In some implementations, generating, by the spatial filtering convolutional layer in the neural network, the spatial filtered output the first data and the second data may include filtering the first data and the second data using short-duration multichannel time convolution filters which map multichannel inputs to a single channel. Generating, by the spatial filtering convolutional layer in the neural network, the spatial filtered output the first data and the second data may include filtering the first data and the second data using multiple finite impulse response filters. Generating, by the spatial filtering convolutional layer in the neural network, the spatial filtered output the first data and the second data may include filtering the first data using each of a plurality of filters, and filtering the second data using each of the plurality of filters. Generating, by the spatial filtering convolutional layer in the neural network, the spatial filtered output the first data and the second data may include generating a first quantity of first samples from the first data, generating a second quantity of second samples from the second data, the second quantity and the first quantity being the same quantity, striding by one in time across each of the first samples to generate first spatial output, and striding by one in time across each of the second samples to generate second spatial output. Generating, by the spatial filtering convolutional layer in the neural network, the spatial filtered output the first data and the second data may include summing first values in the first spatial output with corresponding values in the second spatial output to generate an output feature map. The spatial filtered output may be the output feature map.

In some implementations, generating, by the spatial filtering convolutional layer in the neural network, the spatial filtered output the first data and the second data may include generating the spatial filtered output using a first time convolution. Generating, by the spectral filtering convolutional layer in the neural network, the spectral filtered output using the spatial filtered output may include generating the spectral filtered output using a second time convolution with a second duration longer than a first duration of the first time convolution. Generating, by the spectral filtering convolutional layer in the neural network, the spectral filtered output using the spatial filtered output may include pooling the spatial filtered output in time to generate a pooled output. Pooling the spatial filtered output in time to generate the pooled output may include non-overlapping max pooling the spatial filtered output along the frequency axis. Pooling the spatial filtered output in time to generate the pooled output may include using a pooling size of three to generate the pooled output. Generating, by the spectral filtering convolutional layer in the neural network, the spectral filtered output may include generating the spectral filtered output by applying a rectified non-linearity to the pooled output.

In some implementations, processing, by the one or more additional layers in the neural network, the spectral filtered output to predict sub-word units encoded in both the first raw audio signal and the second raw audio signal may include processing, by a long short-term memory deep neural network included in the neural network, the spectral filtered output to predict sub-word units encoded in both the first raw audio signal and the second raw audio signal. Processing, by the long short-term memory deep neural network included in the neural network, the spectral filtered output to predict sub-word units encoded in both the first raw audio signal and the second raw audio signal may include processing, by a linear low-rank projection layer in the neural network, the spectral filtered output to generate a first intermediate output, and processing, by a long short-term memory layer in the long short-term memory deep neural network, the first intermediate output to generate a second intermediate output. Processing, by the long short-term memory deep neural network included in the neural network, the spectral filtered output to predict sub-word units encoded in both the first raw audio signal and the second raw audio signal may include processing, by a deep neural network layer in the long short-term memory deep neural network, data from the second intermediate output to predict the sub-word units encoded in both the first raw audio signal and the second raw audio signal.

In some implementations, the method may include generating each of the noisy audio signals from a respective one of the clean audio signals by adding noise to the respective clean audio signal. Predicting the clean log-mel features by processing the two clean audio signals for the same period of time, each encoding the one or more sub-word units, using the spatial filtering convolutional layer, the spectral filtering convolutional layer, and the multi-task module may include generating, by the spatial filtering convolutional layer, a spatial filtered output. Predicting the clean log-mel features by processing the two clean audio signals for the same period of time, each encoding the one or more sub-word units, using the spatial filtering convolutional layer, the spectral filtering convolutional layer, and the multi-task module may include generating, by the spectral filtering convolutional layer, a spectral filtered output using the spatial filtered output. Predicting the clean log-mel features by processing the two clean audio signals for the same period of time, each encoding the one or more sub-word units, using the spatial filtering convolutional layer, the spectral filtering convolutional layer, and the multi-task module may include processing, by the multi-task module, the spectral filtered output to predict clean log-mel features for the clean audio signal.

In some implementations, predicting the context dependent states by processing the two noisy audio signals for the same period of time, each encoding the one or more sub-word units, using the spatial filtering convolutional layer, the spectral filtering convolutional layer, and the one or more denoising layers may include generating, by the spatial filtering convolutional layer, a spatial filtered output. Predicting the context dependent states by processing the two noisy audio signals for the same period of time, each encoding the one or more sub-word units, using the spatial filtering convolutional layer, the spectral filtering convolutional layer, and the one or more denoising layers may include generating, by the spectral filtering convolutional layer, a spectral filtered output using the spatial filtered output. Predicting the context dependent states by processing the two noisy audio signals for the same period of time, each encoding the one or more sub-word units, using the spatial filtering convolutional layer, the spectral filtering convolutional layer, and the one or more denoising layers may include processing, by the denoising layers, the spectral filtered output to predict dependent states for the noisy audio signal. The method may include providing the spatial filtering convolutional layer, the spectral filtering convolutional layer, and the multi-task module to a device for predicting sub-word units encoded in both a first raw audio signal and a second raw audio signal for the same period of time.

Figure 4:
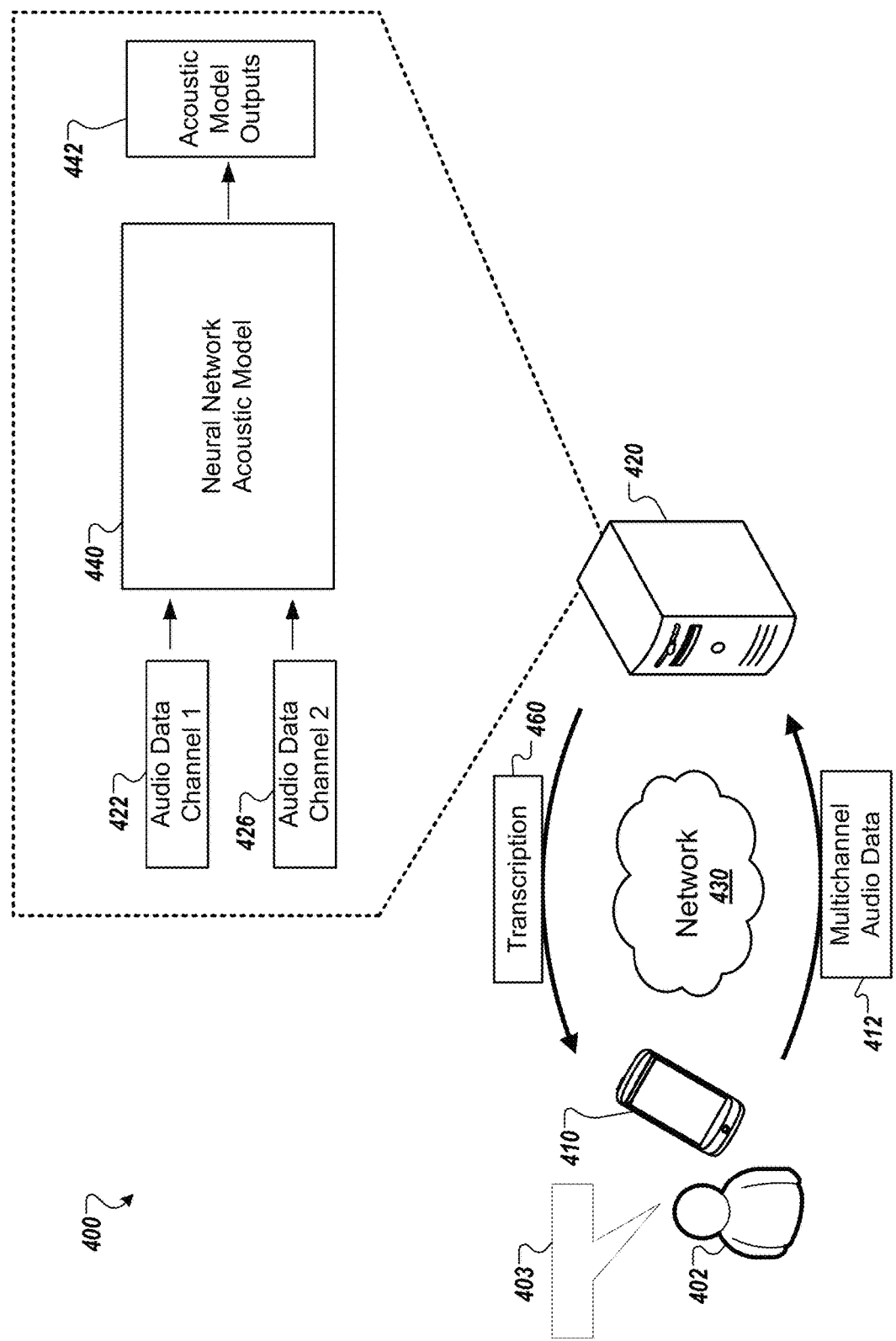
FIG. 4 is a diagram that illustrates an example of a system for speech recognition using neural networks.

FIG. 4 is a diagram that illustrates an example of a system 400 for speech recognition using neural networks. The system 400 includes a client device 410, a computing system 420, and a network 430. In the example, the computing system 420 provides information about an utterance and additional information to a neural network acoustic model 440. The computing system 420 uses output from the neural network acoustic model 440 to identify a transcription for the utterance.

In the system 400, the client device 410 can be, for example, a desktop computer, laptop computer, a tablet computer, a wearable computer, a cellular phone, a smart phone, a music player, an e-book reader, a navigation system, or any other appropriate computing device. The functions performed by the computing system 420 can be performed by individual computer systems or can be distributed across multiple computer systems. The network 430 can be wired or wireless or a combination of both and can include the Internet.

In the illustrated example, a user 402 of the client device 410 speaks an utterance 403, and the client device 410 records audio that includes the speech. The client device 410 obtains multiple channels of audio data for the utterance 403, for example, recorded data from two or more microphones that are located at different spatial positions with respect to the user 403. The client device 410 transmits the multi-channel audio data 412 to the computing system 420 over the network 430. The multi-channel audio data 412 can include audio waveform data, which may or may not be compressed, for each of multiple audio channels.

The computing system 420 receives the multichannel audio data 412 and obtains information corresponding to different time periods or windows of the data. For example, the computing system 420 may obtain audio data 422 for a first channel and audio data 426 for a second channel. For each channel, the computing system 420 may divide the data into segments that represent acoustic properties of, for example, a 10 millisecond (ms), 25 ms, or 50 ms portion of the audio signal 412.

Figure 5:
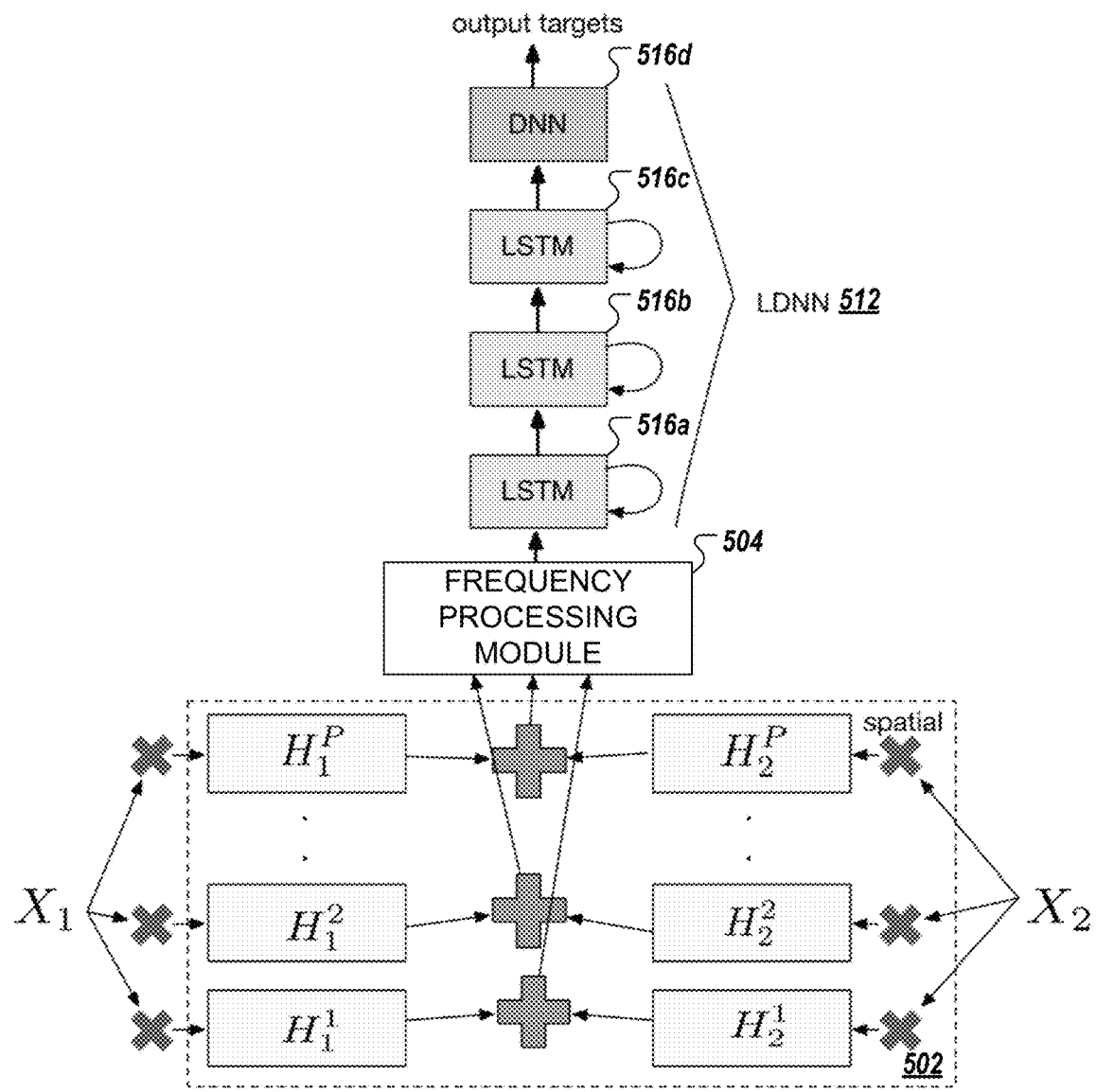
FIGS. 5 and 6 are diagrams showing examples of multichannel speech recognition systems that operate with reduced computational demands while maintaining appropriate accuracy.

In some implementations, such as discussed in more detail with respect to FIG. 5, the audio data 422, 426 is frequency-domain audio data. For example, the computing system 420 may perform a Fourier transform on segments of the audio received from the client device 410, so that the inputs to the neural network acoustic model 440 are frequency-domain representations, e.g., vectors representing frequency-domain characteristics, of portions of the audio that includes the utterance 403.

In the illustrated example, the computing system 420 inputs the audio data 422, 426 to the neural network acoustic model 440. The neural network acoustic model 440 can be a neural network that has been trained to act as an acoustic model. For example, the neural network acoustic model 440 indicates likelihoods that feature vectors correspond to different speech units when the feature vectors and certain types of additional information are provided. The neural network acoustic model 440 can represent any of the neural network models or systems 100, 500, 600 discussed herein.

The neural network acoustic model 440 produces outputs 442 in response to the audio data 422, 426, and the computing system 420 uses the outputs 442 to identify a transcription 460 for the audio signal 412. As discussed above, the outputs 442 may indicate likelihoods that specific subword units, e.g., phones or HMM states of phones, which may be context-dependent or context-independent, describe the audio data in a portion of the utterance. For example, the computing system 420 may provide the outputs 442 to, for example, weighted finite state transducers that approximate a hidden Markov model (HMM), which may include information about a lexicon indicating the phonetic units of words, a grammar, and a language model that indicates likely sequences of words. The output of the HMM can be a word lattice from which the computing system 420 derives a transcription 460. The computing system 420 then provides the transcription 460 to the client device 410 over the network 430.

The client device 410 can then perform an action in response to receiving the transcription 460. For example, the client device 410 may display the transcription 460, include the text of the transcription 460 in a message or input field, obtain search results using the transcription 460 as a query, perform a voice command indicated by the transcription 460, open an application identified using the transcription 460, provide the transcription 460 to an application or another device, or otherwise act in response to receiving the transcription 460.

The example of FIG. 4 shows the speech recognition process being performed by a server that uses the neural network acoustic model 440. In some implementations, the client device 410 or another user device stores the neural network acoustic model 440 and performs the speech recognition processing locally, without sending audio data over a network for processing.

Figure 6:
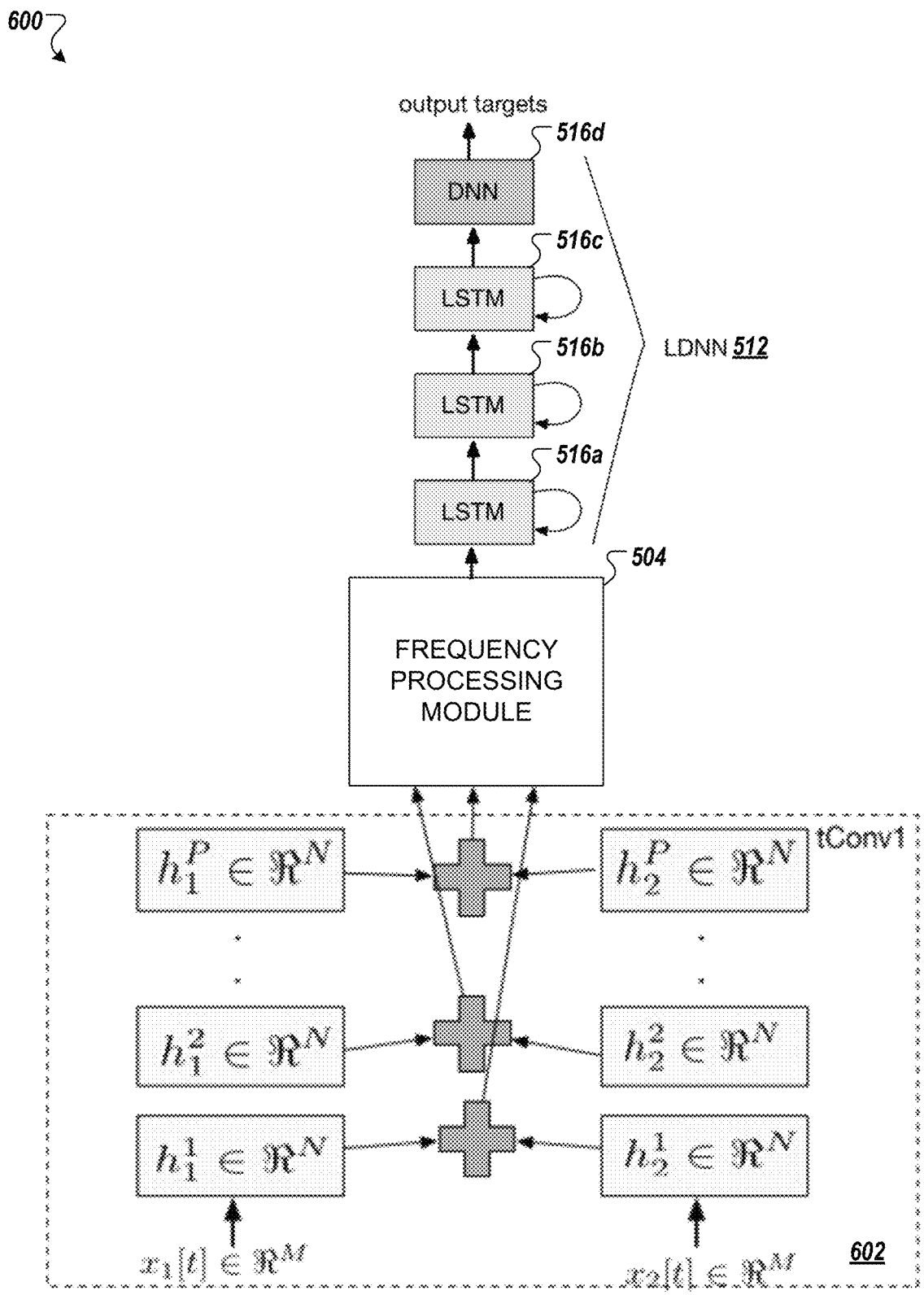

FIGS. 5 and 6 show examples of multichannel speech recognition systems 500 and 600 respectively, that each operate with reduced computational demands while maintaining the accuracy of phonetic unit predictions. Reducing the computational demands can provide a number of advantages, including reducing power usage, reducing latency, and increasing the responsiveness of the system. In some instances, the computational demands are reduced sufficiently to permit operation on a mobile device such as a phone, a tablet computer, etc.

The system 500 generally includes a multichannel spatial filtering convolutional layer 502, a frequency-processing module 504, and a long short-term memory deep neural network (LDNN) 512. In some implementations, the LDNN 512 can be a convolutional LDNN. The LDNN 512 generally includes three long-short term memory (LSTM) layers 516a-c, and a deep neural network (DNN) layer 516d. In general, the system 500 can be used to perform both spatial and spectral filtering in the frequency domain. The input to the spatial filtering convolutional layer 502 can be frequency domain data, denoted by $X_1$ and $X_2$.

The system 600 generally includes several of the same components as the system 500, except that the system 600 includes a spatial filtering convolutional layer 602 that generates a spatial filtered output from multichannel audio input using time-domain signal processing computations. More particularly, in the system 600, only the spectral filtering is performed in the frequency domain. The input to the spatial filtering convolutional layer 602 can be time domain data, denoted by $x_1$ and $x_2$. A Fourier transform process (not shown) may be used to convert the results of spatial filtering before providing the data to the frequency-processing module 504.

Several techniques for reducing the computational demands of a factored multi-channel acoustic model processing can be used. Some techniques adjust the parameters and model structure used for time-domain processing. For example, the acoustic model shown in FIG. 5 can be enhanced by reducing the number of look directions and/or increasing the stride size for convolutions in the time domain. In addition, or as an alternative, the time-domain convolution processing for the spatial filtering layer, the spectral filtering layer, or both can be replaced with more efficient frequency domain processing. For example, time-domain convolutions in the model of FIG. 1 can be replaced with element-wise multiplication in the frequency domain. FIG. 5 shows an example of an acoustic model 500 that uses frequency domain processing instead of time-domain convolution for both spatial filtering and spectral filtering. FIG. 6 shows an example of an acoustic model 600 that uses frequency-domain processing instead of time-domain convolution to perform spectral filtering, but retains time-domain processing for spatial filtering.

As discussed above, multichannel ASR systems often use separate modules to perform recognition. First, microphone array speech enhancement is applied, typically broken into localization, beamforming and post-filtering stages. The resulting single channel enhanced signal is passed to an acoustic model. A commonly used enhancement technique is filter-and-sum beamforming, which begins by aligning signals from different microphones in time (via localization) to adjust for the propagation delay from the target speaker to each microphone. The time-aligned signals are then passed through a filter (different for each microphone) and summed to enhance the signal from the target direction and to attenuate noise coming from other directions.

Instead of using independent modules for multichannel enhancement and acoustic modeling, optimizing both jointly has been shown to improve performance, both for Gaussian Mixture Models and more recently for neural networks. The system includes a "factored" raw waveform model, which passes a multichannel waveform signal into a set of short-duration multichannel time convolution filters which map the inputs down to a single channel, with the idea that the network would learn to perform broadband spatial filtering with these filters. By learning several filters in this "spatial filtering layer", it can be hypothesized that the network will learn filters tuned to multiple different look directions. The single channel waveform output of each spatial filter is passed to a longer-duration time convolution "spectral filtering layer" intended to perform finer frequency resolution spectral decomposition analogous to a time-domain auditory filterbank. The output of this spectral filtering layer is passed to a CLDNN acoustic model.

One of the problems with the factored model is its high computational cost. For example, a model may use around 20M parameters but requires 160M multiplies, with the bulk of the computation occurring in the "spectral filtering layer". The number of filters in this layer is large and the input feature dimension is large compared to the filter size. Furthermore, this convolution is performed for each of 10 look directions in some implementations. This specification explores various approaches to speed up this model without affecting accuracy.

First, the specification describes speeding up the model in the time domain. Using behavior observed with convolutions, by striding filters and limiting the look directions one is able to reduce the required number of multiplies by a factor of 4.5 with no loss in accuracy.

Next, since convolution in time is equivalent to an element-wise dot product in frequency, the specification describes a factored model that operates in the frequency domain. Two variations on this idea are described, one which performs filtering via a Complex Linear Projection (CLP) layer that uses phase information from the input signal, and another which performs filtering with a Linear Projection of Energy (LPE) layer that ignores phase. Both the CLP and LPE factored models perform similarly, and are able to reduce the number of multiplies by an additional 25% over time domain model, with similar performance in terms of word error rate (WER). A detailed analysis on the differences in learning the factored model in the time and frequency domains is provided. This duality opens the door to further improve the model. For example increasing the input window size improves WER, but is much more computationally efficient in the frequency domain compared to the time domain.

The raw waveform factored multichannel network, shown in FIG. 5, factors spatial filtering and filterbank feature extraction into separate layers. The motivation for this architecture is to design the first layer to be spatially selective, while implementing a frequency decomposition shared across all spatial filters in the second layer. The output of the second layer is the Cartesian product of all spatial and spectral filters.

The first layer, denoted by tConv1 in FIG. 5, implements Equation 1 and performs a multichannel convolution in time using a FIR spatial filterbank. First, implementing the equation includes taking a small window of the raw waveform of length M samples for each channel C, denoted as {x1[t]; x2[t], ..., xC[t]} for t∑1, ..., M.

The signal is passed through a bank of P spatial filters which convolve each channel c with a filter containing N taps: $h_c = \{h_c^1, h_c^2, \ldots, h_c^P\}$. The convolutional filter can be strided by 1 in time across M samples and perform a "same" convolution, such that the output for each convolutional filter remains length M. Finally, the outputs from each channel are summed to create an output feature of size $y[t] \in \mathcal{R}^{M \times 1 \times P}$ where the dimensions correspond to time (sample index), frequency (spatial filter index), and look direction (feature map index), respectively. The operation for each look direction p is given by Equation 3, where '*' denotes the convolution operation.

$$y^p[t] = \sum_{c=1}^{C} x_c[t] * h_c^p \quad (3)$$

The second convolution layer, denoted by tConv2 in FIG. 1, consists of longer duration single channel filters. This layer is designed to learn a decomposition with better frequency resolution than the first layer but is incapable of performing any spatial filtering since the input contains a single channel. This specification includes performing a time convolution on each of these P output signals from the first layer, as in an example single channel time convolution layer. The parameters of this time convolution are shared across all P feature maps or "look directions". Other steps include denoting this layer's filters as $g \in \mathcal{R}^{L \times F \times 1}$, where 1 indicates sharing across the P input feature maps. When striding this convolution by S samples, the "valid" convolution produces an output $$w[t] \in \mathcal{R}^{\frac{M-L+1}{S} \times F \times P}.$$

The stride S can be set to 1. The output of the spectral convolution layer for each look direction p and each filter f is given by Equation 4.

$$w_f^p[t] = y^p[t] * g_f \quad (4)$$

The filterbank output is then max-pooled in time thereby discarding short-time (i.e. phase) information, over the entire time length of the output signal frame, producing an output of dimension 1×F×P. This is followed by a rectifier nonlinearity and stabilized logarithmic compression[1], to produce a frame-level feature vector at frame l: $z_l \in \mathcal{R}^{1 \times F \times P}$. The input window is shifted by 10 ms and repeat this time convolution to produce a set of time-frequency-direction frames. The output out of the time convolutional layer (tConv2) produces a frame-level feature z[l] which is passed to a CLDNN acoustic model, which contains 1 frequency convolution, 3 LSTM and 1 DNN layer.

To understand where the computational complexity lies in the factored model, the number of multiplications in the spatial convolution layer from Equation 3 can be counted. A "same" convolution between filter h of length N, and input xi of length M requires M×N multiplies. Computing this convolution for each channel c in each look direction p results in a total of P×C×M×N multiplies for the first layer. Using C=2, P=10, M=81 (corresponding to 5 ms filters) and N=561 (35 ms input size), corresponds to 908.8K multiplies.

Next, a count of the number of multiplies for the spectral convolution layer can be determined, where the spectral convolution layer is described by Equation 4. A "valid" convolution between filter g of length L, stride S and input $y_i$ of length N requires $$\frac{N-L+1}{S} \times L$$

multiplies. Computing this convolution for each look direction p and each filter f results in a total of P×F×L×(N−L+1)/S multiplies. Using N=561 (35 ms input size), L=401 (25 ms filters) P=10, S=1, and F=128, this corresponds to 82.6M multiplies.

TABLE 1

| Computational Complexity in Time | | |
|---|---|---|
| Layer | Total Multiplies | In Practice [1] |
| spatial | P × C × M × N | 908.8K |
| spectral | P × F × L × (N − L + 1)/S | 82.6M |
| CLDNN | — | 19.5M |

The remainder of the CLDNN model uses approximately 20M multiplies, leaving the majority of the computation of the factored model in the spectral filtering layer tConv2.

Reducing any of the parameters P, N, L, F or increasing S will decrease the amount of computation. Earlier innovations showed that reducing the input window size N, filter size L or filter outputs F degrades performance. Computational cost (and the number of parameters) can be reduced by reducing the number of look directions P and increasing in the stride S without degrading performance. For example, using a stride of S=4 reduces the number of multiplies by 4 and has been shown to be a good trade-off between cost and accuracy in other applications.

Regarding FIGS. 4 and 5, as an alternative to tuning the parameters of the time domain model, the factored model can be implemented in the frequency domain in which quadratic-time time-domain convolutions can be implemented much more efficiently as linear-time element-wise products. In some implementations, a frequency processing module can be used, at least in part, to implement the factored model in the frequency domain.

For frame index l and channel c, denote $X_c[l] \in \mathbb{C}^K$ as the result of an M-point Fast Fourier Transform (FFT) of $x_c[t]$ and $H_c^p \in \mathbb{C}^K$ as the FFT of $H_c^p$. Note that negative frequencies can be ignored because the time domain inputs are real, and thus our frequency domain representation of an M-point FFT contains only K=M/2+1 unique complex-valued frequency bands. The spatial convolution layer in Equation 3 can be represented by Equation 5 in the frequency domain, where · denotes element-wise product. The output of this layer can be denoted as $Y^p[l] \in \mathbb{C}^K$ for each look direction p:

$$Y^p[l] = \sum_{c=1}^{C} X_c[l] \cdot H_c^p \quad (5)$$

Two different methods for implementing the "spectral filtering" layer in the frequency domain can be used. The convolution in Equation 4 can be re-written as an element-wise product in frequency, for each filter f and look direction p, where $W_f^p[l] \in \mathbb{C}^K$:

$$W_f^p[l] = Y^p[l] \cdot G_f \quad (6)$$

The frequency-domain equivalent to the max-pooling operation in the time domain model would be to take the inverse FFT of $W_f^p[l]$ and performing the same pooling operation in the time domain, which is computationally expensive to do for each look direction p and filter output f. As an alternative recently proposed the Complex Linear Projection (CLP) model which performs average pooling in the frequency domain and results in similar performance to a single channel raw waveform model. Similar to the waveform model the pooling operation is followed by a pointwise absolute-value non-linearity and log compression. The 1-dimensional output for look direction p and filter f is given by:

$$|Z_f^p[l]| = \log \left| \sum_{k=1}^{N} W_f^p[l, k] \right| \quad (7)$$

The specification also describes an alternative decomposition that is motivated by the log-mel filterbank. Given the complex-valued FFT for each look direction, Y p[l], one can first compute the energy at each time-frequency bin (l, k):

$$\hat{Y}^p[l,k] = |Y^p[l,k]|^2 \quad (8)$$

After applying a power compression with $\alpha=0.1$, $\hat{Y}^p[l]$ is linearly projected down to an F dimensional space, in a process similar to the mel filterbank, albeit with learned filter shapes:

$$Z_f^p[l] = G_f \times (\hat{Y}^p[l])^\alpha \quad (9)$$

As in the other models, the projection weights $G \in \mathcal{R}^{K \times F}$, are shared across all look directions. The main difference between the CLP and LPE models is that the former retains phase information when performing the filterbank decomposition with matrix G. In contrast, LPE operates directly on the energy in each frequency band with the assumption that phase not important for computing features.

The total number of multiplies for the frequency domain spatial layer is 4×P×C×K, where 4 comes from the complex multiplication operation. The total number of multiplies for the CLP spectral layer is be 4×P×F×K. Since the LPE model operates on real-valued FFT energies, the total number of multiplies for the LPE spectral layer is reduced to P×F×K.

Using 32 ms input frames for xc[t] and a 512 point FFT results in K=257 frequency-band $X_c$. Keeping the same parameters as discussed above, P=10, C=2 and F=128, Table 2 shows the total number of multiplies needed for each frequency model in practice. Comparing the number of multiplies used in the spectral filtering layer to the waveform model in Table 2 it can be shown that the CLP model's computational requirements are about 80-times smaller than the baseline time domain model. For the LPE model, this reduction is about 250-times.

TABLE 2

| Computational Complexity in Frequency | | |
|---|---|---|
| Layer | Total Multiplies | In Practice |
| spatial | 4 × P × C × K | 20.6K |
| spectral-CLP | 4 × P × F × K | 1.32M |
| spectral-LPE | P × F × K | 330.2K |

FIG. 5 shows an example system 500 in which both spatial and spectral filtering are performed in the frequency domain. FIG. 6 shows an example of a system 600 in which only the spectral filtering is performed in the frequency domain, while the spatial filtering can be performed in the time-domain with enhancements to, e.g., the number of look directions and stride parameters. In the system 600, a discrete Fourier transform can be applied to spatial filtering output before processing in the frequency processing module.

Some example implementations can involve use of approximately 2,000 hours of noisy training data consisting of 3 million English utterances. This data set is created by artificially corrupting clean utterances using a room simulator, adding varying degrees of noise and reverberation. The clean utterances are anonymized and hand-transcribed voice search queries, and are representative of Google's voice search traffic. Noise signals, which include music and ambient noise sampled from YouTube and recordings of "daily life" environments, are added to the clean utterances at SNRs ranging from 0 to 20 dB. Reverberation is simulated using an image model—room dimensions and microphone array positions are randomly sampled from 100 possible room configurations with RT60S ranging from 400 to 900 ms. The simulation uses a 2-channel linear microphone array, with inter-microphone spacing of 14 cm. Both noise and target speaker locations change between utterances; the distance between the sound source and the microphone array varies between 1 to 4 meters. The speech and noise azimuths were uniformly sampled from the range of ±45 degrees and ±90 degrees, respectively, for each utterance.

The evaluation set consists of a separate set of about 30,000 utterances (over 20 hours), and is created by simulating similar SNR and reverberation settings to the training set. The room configurations, SNR values, RT60 times, and target speaker and noise positions in the evaluation set differ from those in the training set, although the microphone array geometry between the training and simulated test sets is identical.

All CLDNN models are trained with the cross-entropy (CE) and sequence training (ST) criterion, using asynchronous stochastic gradient descent (ASGD) optimization. All networks have 13,522 context dependent state output targets.

Computational complexity of the raw waveform factored model can be reduced by varying look directions P and stride S. Table 3 shows the WER for CE and ST criteria, as well as the total number of multiplication and addition operations (M+A) for different parameter settings. The table shows that the number of operations can be reduced from 157.7M to 88.2M, by reducing the look directions P from 10 to 5, with no loss in accuracy. The stride can also be increased up to S=4 with no loss in accuracy after ST, which reduces multiplies from 88.2M to 42.5M. Depending on the implementation, the frequency convolution layer 110 from FIG. 1 may be omitted. Removing the fConv layer from the CLDNN, which may not help on noisier training sets, reduces multiplies further. The frequency convolution layer is omitted from the systems 500, 600 of both FIGS. 5 and 6. However, the frequency convolution layer may be retained in some implementations. Overall, multiplies can be reduced from 157.7M to 35.1M, a factor of 4.5×.

Next, the performance of the frequency domain factored model is explored. Note this model does not have any fConv layer. A similar setting to the best configuration discussed above can be used, namely P=5 and F=128. The input window is 32 ms instead of 35 ms in the waveform model, as this allows us to take a M=512-point FFT at a sampling rate of 16 khZ. In some implementations, a 35 ms input requires a 1024-point FFT, and there is no performance difference between 32 ms and 35 ms raw waveform inputs.

TABLE 3

Raw waveform Factored Model Performance

| P | S | Spatial M + A | Spectral M + A | Total M + A | WER CE | WER ST |
|---|---|---|---|---|---|---|
| 10 | 1 | 1.1M | 124.0M | 157.7M | 20.4 | 17.2 |
| 5 | 1 | 525.6K | 62.0M | 88.2M | 20.7 | 17.3 |
| 3 | 1 | 315.4K | 37.2M | 60.4M | 21.6 | — |
| 5 | 2 | 525.6K | 31.1M | 57.4M | 20.7 | — |
| 5 | 4 | 525.6K | 15.7M | 42.5M | 20.7 | 17.3 |
| 5 | 6 | 525.6K | 10.6M | 36.8M | 20.9 | |
| 5 | 4 | 525.6K | 15.7M | 35.1M | 20.4 | 17.1 no fConv |

Table 4 shows that the performance of both the CLP and LPE factored models are similar. Furthermore, both models reduce the number of operations by a factor of 1.9× over the best waveform model from Table 3, with a small degradation in WER.

TABLE 4

Frequency Domain Factored Model Performance

| Model | Spatial M + A | Spectral M + A | Total M + A | WER CE | WER ST |
|---|---|---|---|---|---|
| CLP | 10.3K | 655.4K | 19.6M | 20.5 | 17.3 |
| LPE | 10.3K | 165.1K | 19.1M | 20.7 | 17.2 |

A comparison between learning in time vs. frequency shows some differences in the spatial responses (i.e., beam patterns) for the time and frequency domain spatial layers. Since the LPE and CLP models have the same spatial layer and the beam patterns were found to look similar, only the CLP model is plotted for simplicity. The beam patterns show the magnitude response in dB as a function of frequency and direction of arrival, i.e. each horizontal slice of the beam pattern corresponds to the filter's magnitude response for a signal coming from a particular direction. In each frequency band (vertical slice), lighter shades indicate that sounds from those directions are passed through, while darker shades indicate directions whose energy is attenuated. The figures show that the spatial filters learned in the time domain are band-limited, unlike those learned in the frequency domain. Furthermore, the peaks and nulls are aligned well across frequencies for the time domain filters.

The differences between these models can further be seen in the magnitude responses of the spectral layer filters, as well as in the outputs of the spectral layers from different look directions plotted for an example signal. The magnitude responses in both time and CLP models look qualitatively similar, and learn bandpass filters with increasing center frequency. However, because the spatial layers in time and frequency are quite different, the spectral layer outputs in time are much more diverse in different spatial directions compared to the CLP model. In contrast to these models, the LPE spectral layer does not seem to learn bandpass filters.

At some level, time-domain and frequency-domain representations are interchangeable, but they result in networks that are parameterized very differently. Even though the time and frequency models all learn different spatial filters, they all seem to have similar WERs. In addition, even though the spatial layer of the CLP and LPE models are different, they too seem to have similar performance. There are roughly 18M parameters in the CLDNN model that sits above the spatial/spectral layers, which accounts for over 90% of the parameters in the model. Any differences between the spatial layers in time and frequency are likely accounted for in the CLDNN part of the network.

WER can be improved by increasing the window size (and therefore computational complexity) of the factored models. Specifically, since longer windows typically help with localization, using 64 ms input windows for both models can be explored. By reducing computational complexity in other aspects of the model, room is opened in the computational budget to add processing of larger windows, which can increase accuracy. With a 64 ms input, the frequency models require a 1024-point DFT. Table 5 shows that the frequency models improve the WER over using a smaller 32 ms input, and still perform roughly the same. However, the frequency model now has an even larger computational complexity savings of 2.7× savings compared to the time domain model.

TABLE 5

Results with a 64 ms Window Size

| Feat | Spatial M + A | Spectral M + A | Total M + A | WER ST |
|---|---|---|---|---|
| time | 906.1K | 33.81M | 53.6M | 17.1 |
| freq-CLP | 20.5K | 1.3M | 20.2M | 17.1 |
| freq-LPE | 20.5K | 329.0K | 19.3M | 16.9 |

Figure 7:
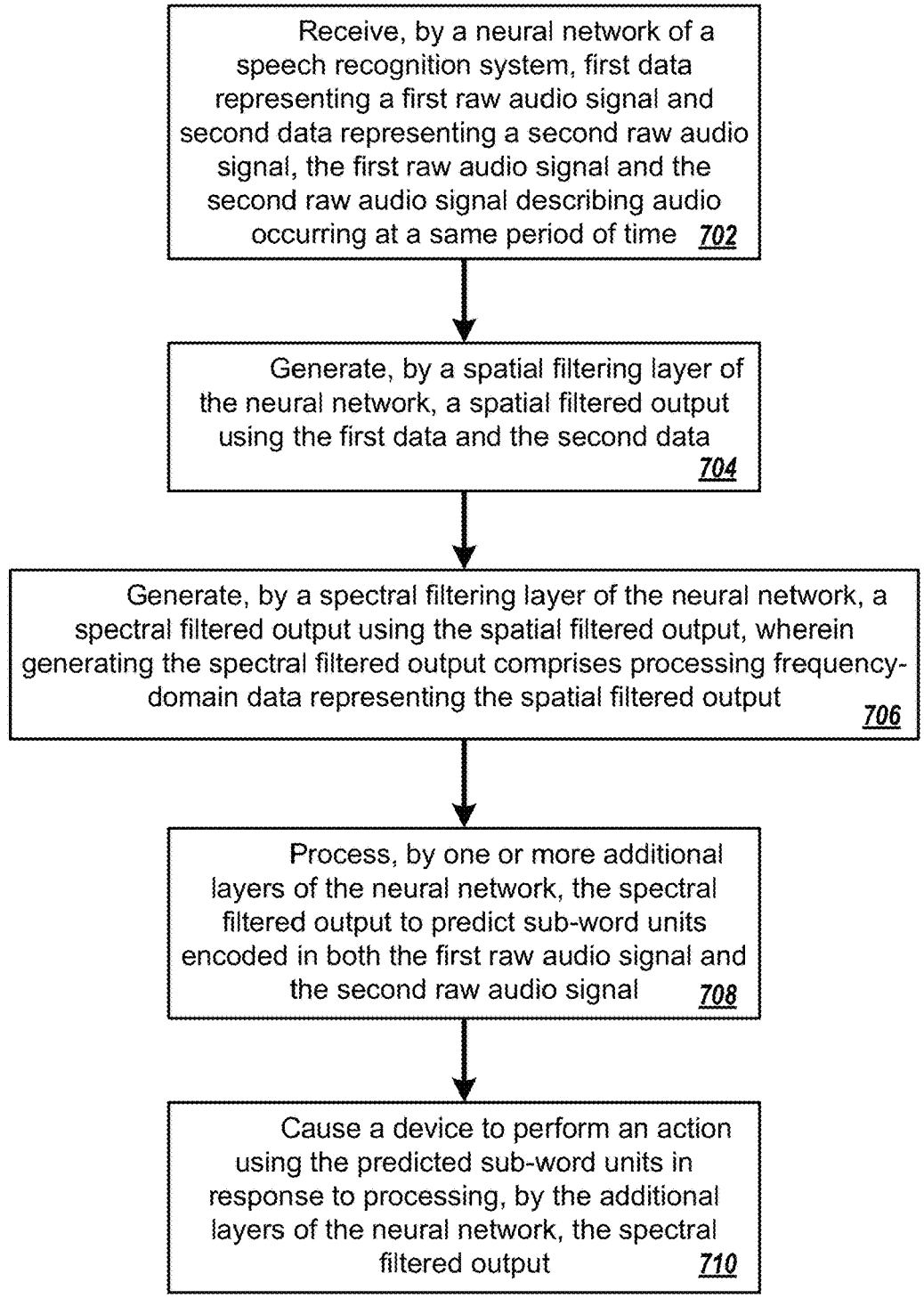
FIG. 7 is a flow diagram of a process for predicting a sub-word unit encoded in two raw audio signals for the same period of time.

FIG. 7 is a flow diagram that illustrates an example of a process 700 for speech recognition using neural networks.

More particularly, the process 700 relates to a process for predicting a sub-word unit encoded in two raw audio signals for the same period of time. The process 700 may be performed by a data processing apparatus, such as the computing system 420 described above or another data processing apparatus.

First data and second data are received by a neural network of a speech recognition system (702). The first data can represent a first raw audio signal and the second data can represent a second raw audio signal. The first raw audio signal and the second raw audio signal can each describe audio occurring at a same period of time.

A spatial filtered output is generated using the first data and the second data (704). The spatial filtered output can be generated by a spatial filtering layer of the neural network. In some implementations, generating the spatial filtered output using the first data and the second data can include performing element-wise multiplications of frequency-domain representations of the first data and the second data with frequency domain representations of filters learned through training of the neural network.

Using the spatial filtered output, a spectral filtered output is generated by a spectral filtering layer of the neural network (706). Generating the spectral filtered output can comprise processing frequency-domain data representing the spatial filtered output. In some implementations, generating the spectral filtered output, by the spectral filtering layer of the neural network, using the spatial filtered output can include generating filtered data by using an element-wise multiplication of (i) the frequency-domain data representing the spatial filtered output with (ii) frequency-domain representations of multiple filters.

Additionally, in some implementations, generating the spectral filtered output, by the spectral filtering layer of the neural network, using the spatial filtered output can include performing a complex linear projection (CLP) of the filtered data in the frequency domain to generate a CLP output, and applying an absolute-value function and a log compression to the CLP output. Likewise, generating the spectral filtered output, by the spectral filtering layer of the neural network, using the spatial filtered output can also include performing a linear projection of energy using the filtered data.

In some implementations, performing the linear projection of energy using the filtered data can include determining an energy value for each of multiple time-frequency bins. Moreover, performing the linear projection of energy using the filtered data can also include applying a power compression to the energy values to generate compressed energy values. Further still, performing the linear projection of energy using the filtered data can also include linearly projecting the compressed energy values using filters with learned filter parameters.

The spectral filtered output is processed, by one or more additional layers of the neural network, to predict sub-word units encoded in both the first raw audio signal and the second raw audio signal (708).

In response to processing the spectral filtered output by the additional layers of the neural network, a device can be caused to perform an action using the predicted sub-word units. In some implementations, the process 700 can include additional steps, fewer steps, or some of the steps can be divided into multiple steps.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Figure 8:
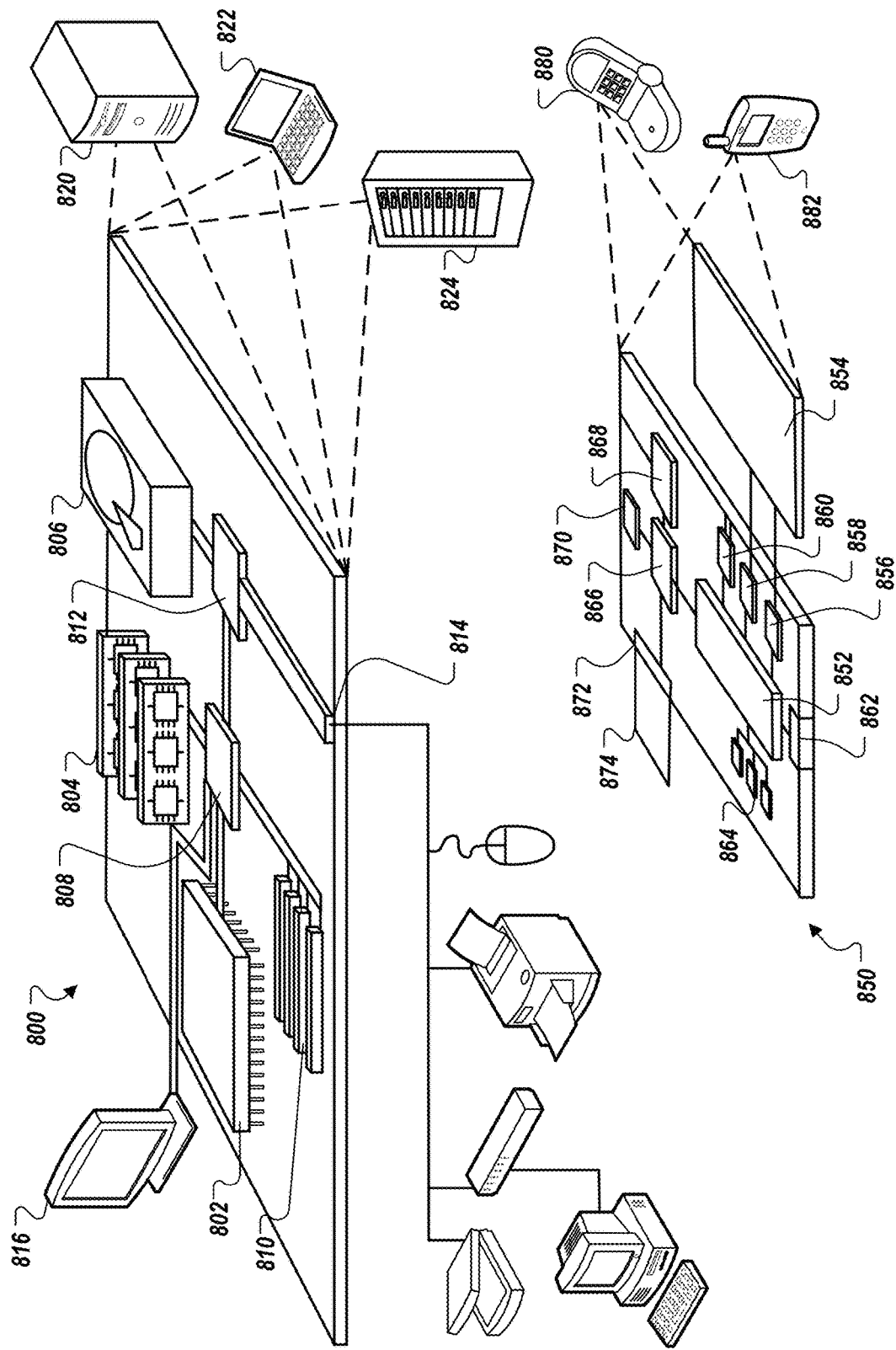
FIG. 8 is a block diagram of a computing system that can be used in connection with computer-implemented methods described in this document.

FIG. 8 is a block diagram of computing devices 800, 850 that may be used to implement the systems and methods described in this document, as either a client or as a server or plurality of servers. Computing device 800 is intended to represent various forms of digital computers, such as laptops, desktops, workstations, personal digital assistants, servers, blade servers, mainframes, and other appropriate computers. Computing device 850 is intended to represent various forms of mobile devices, such as personal digital assistants, cellular telephones, smartphones, smartwatches, head-worn devices, and other similar computing devices. The components shown here, their connections and relationships, and their functions, are meant to be exemplary only, and are not meant to limit implementations described and/or claimed in this document.

Computing device 800 includes a processor 802, memory 804, a storage device 806, a high-speed interface 808 connecting to memory 804 and high-speed expansion ports 810, and a low speed interface 812 connecting to low speed bus 814 and storage device 806. Each of the components 802, 804, 806, 808, 810, and 812, are interconnected using various busses, and may be mounted on a common motherboard or in other manners as appropriate. The processor 802 can process instructions for execution within the computing device 800, including instructions stored in the memory 804 or on the storage device 806 to display graphical information for a GUI on an external input/output device, such as display 816 coupled to high speed interface 808. In other implementations, multiple processors and/or multiple buses may be used, as appropriate, along with multiple memories and types of memory. Also, multiple computing devices 800 may be connected, with each device providing portions of the necessary operations (e.g., as a server bank, a group of blade servers, or a multi-processor system).

The memory 804 stores information within the computing device 800. In one implementation, the memory 804 is a computer-readable medium. In one implementation, the memory 804 is a volatile memory unit or units. In another implementation, the memory 804 is a non-volatile memory unit or units.

The storage device 806 is capable of providing mass storage for the computing device 800. In one implementation, the storage device 806 is a computer-readable medium. In various different implementations, the storage device 806 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 804, the storage device 806, or memory on processor 802.

The high speed controller 808 manages bandwidth-intensive operations for the computing device 800, while the low speed controller 812 manages lower bandwidth-intensive operations. Such allocation of duties is exemplary only. In one implementation, the high-speed controller 808 is coupled to memory 804, display 816 (e.g., through a graphics processor or accelerator), and to high-speed expansion ports 810, which may accept various expansion cards (not shown). In the implementation, low-speed controller 812 is coupled to storage device 806 and low-speed expansion port 814. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 820, or multiple times in a group of such servers. It may also be implemented as part of a rack server system 824. In addition, it may be implemented in a personal computer such as a laptop computer 822. Alternatively, components from computing device 800 may be combined with other components in a mobile device (not shown), such as device 850. Each of such devices may contain one or more of computing device 800, 850, and an entire system may be made up of multiple computing devices 800, 850 communicating with each other.

Computing device 850 includes a processor 852, memory 864, an input/output device such as a display 854, a communication interface 866, and a transceiver 868, among other components. The device 850 may also be provided with a storage device, such as a microdrive or other device, to provide additional storage. Each of the components 850, 852, 864, 854, 866, and 868, are interconnected using various buses, and several of the components may be mounted on a common motherboard or in other manners as appropriate.

The processor 852 can process instructions for execution within the computing device 850, including instructions stored in the memory 864. The processor may also include separate analog and digital processors. The processor may provide, for example, for coordination of the other components of the device 850, such as control of user interfaces, applications run by device 850, and wireless communication by device 850.

Processor 852 may communicate with a user through control interface 858 and display interface 856 coupled to a display 854. The display 854 may be, for example, a TFT LCD display or an OLED display, or other appropriate display technology. The display interface 856 may comprise appropriate circuitry for driving the display 854 to present graphical and other information to a user. The control interface 858 may receive commands from a user and convert them for submission to the processor 852. In addition, an external interface 862 may be provide in communication with processor 852, so as to enable near area communication of device 850 with other devices. External interface 862 may provide, for example, for wired communication (e.g., via a docking procedure) or for wireless communication (e.g., via Bluetooth or other such technologies).

The memory 864 stores information within the computing device 850. In one implementation, the memory 864 is a computer-readable medium. In one implementation, the memory 864 is a volatile memory unit or units. In another implementation, the memory 864 is a non-volatile memory unit or units. Expansion memory 874 may also be provided and connected to device 850 through expansion interface 872, which may include, for example, a SIMM card interface. Such expansion memory 874 may provide extra storage space for device 850, or may also store applications or other information for device 850. Specifically, expansion memory 874 may include instructions to carry out or supplement the processes described above, and may include secure information also. Thus, for example, expansion memory 874 may be provide as a security module for device 850, and may be programmed with instructions that permit secure use of device 850. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 864, expansion memory 874, or memory on processor 852.

Device 850 may communicate wirelessly through communication interface 866, which may include digital signal processing circuitry where necessary. Communication interface 866 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 868. In addition, short-range communication may occur, such as using a Bluetooth, WiFi, or other such transceiver (not shown). In addition, GPS receiver module 870 may provide additional wireless data to device 850, which may be used as appropriate by applications running on device 850.

Device 850 may also communicate audibly using audio codec 860, which may receive spoken information from a user and convert it to usable digital information. Audio codec 860 may likewise generate audible sound for a user, such as through a speaker, e.g., in a handset of device 850. Such sound may include sound from voice telephone calls, may include recorded sound (e.g., voice messages, music files, etc.) and may also include sound generated by applications operating on device 850.

The computing device 850 may be implemented in a number of different forms, as shown in the figure. For example, it may be implemented as a cellular telephone 880. It may also be implemented as part of a smartphone 882, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the systems and techniques described here), or any combination of such back-end, middleware, or front-end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention. For example, various forms of the flows shown above may be used, with steps re-ordered, added, or removed. Also, although several applications of the payment systems and methods have been described, it should be recognized that numerous other applications are contemplated. Accordingly, other embodiments are within the scope of the following claims.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method when executed on data processing hardware causes the data processing hardware to perform operations comprising:
receiving multi-channel audio data representing an utterance captured by multiple microphones during a same period of time, the multi-channel audio input comprising multiple time-domain audio signals each obtained from a respective one of the multiple microphones, the multiple microphones located at different spatial position with respect to a user that spoke the utterance;
for each of multiple spatial directions, generating a corresponding spatial filtered output by processing each time-domain audio signal among the multiple time-domain audio signals of the multi-channel audio input;
predicting sub-word units encoded in the time-domain audio signals for respective portions of the utterance by processing a frequency-domain representation of the corresponding spatial filtered output generated for each of the multiple spatial direction; and
generating a transcription for the utterance based on the predicted sub-word units encoded in the time-domain audio signal for the respective portions of the utterance.

2. The computer-implemented method of claim 1, wherein the operations further comprise computing a discrete Fourier transform for the corresponding spatial filtered output generated for each of the multiple spatial directions to obtain the frequency-domain representation of the corresponding spatial filtered output.

3. The computer-implemented method of claim 2, wherein computing the discrete Fourier transform for the corresponding spatial filtered output comprises computing a fast Fourier transform for the corresponding spatial filtered output generated for each of the multiple spatial directions.

4. The computer-implemented method of claim 1, wherein:
the corresponding spatial filtered output generated for each of the multiple spatial directions is generated using a spatial filtering convolutional layer of a neural network; and
the frequency-domain representation of the corresponding spatial filtered output generated for each of the multiple spatial directions is processed using one or more additional neural network layers of the neural network.

5. The computer-implemented method of claim 4, wherein the neural network is part of a speech recognition model.

6. The computer-implemented method of claim 4, wherein the neural network is part of an acoustic model configured to indicate probabilities of sub-word units.

7. The computer-implemented method of claim 4, wherein at least one additional neural network layer of the one or more additional neural network layers is configured to:
perform feature extraction; and
apply a transformation to the frequency-domain representation of the corresponding spatial filtered output generated for each of the multiple spatial directions.

8. The computer-implemented method of claim 7, wherein the transformation comprises at least one of:
a linear transformation;
a projection;
a complex linear projection; or
a linear projection of energy.

9. The computer-implemented method of claim 4, wherein the corresponding spatial filtered output generated for each of the multiple spatial directions comprises a single channel of time-domain data.

10. The computer-implemented method of claim 4, wherein the spatial filtering convolutional layer and the one or more additional neural network layers are jointly trained during training of the neural network.

11. A system comprising:
data processing hardware; and
memory hardware in communication with the data processing hardware and storing instructions that when executed on the data processing hardware causes the data processing hardware to perform operations comprising:
receiving multi-channel audio data representing an utterance captured by multiple microphones during a same period of time, the multi-channel audio input comprising multiple time-domain audio signals each obtained from a respective one of the multiple microphones, the multiple microphones located at different spatial position with respect to a user that spoke the utterance;
for each of multiple spatial directions, generating a corresponding spatial filtered output by processing each time-domain audio signal among the multiple time-domain audio signals of the multi-channel audio input;
predicting sub-word units encoded in the time-domain audio signals for respective portions of the utterance by processing a frequency-domain representation of the corresponding spatial filtered output generated for each of the multiple spatial direction; and
generating a transcription for the utterance based on the predicted sub-word units encoded in the time-domain audio signal for the respective portions of the utterance.

12. The system of claim 11, wherein the operations further comprise computing a discrete Fourier transform for the corresponding spatial filtered output generated for each of the multiple spatial directions to obtain the frequency-domain representation of the corresponding spatial filtered output.

13. The system of claim 12, wherein computing the discrete Fourier transform for the corresponding spatial filtered output comprises computing a fast Fourier transform for the corresponding spatial filtered output generated for each of the multiple spatial directions.

14. The system of claim 11, wherein:
the corresponding spatial filtered output generated for each of the multiple spatial directions is generated using a spatial filtering convolutional layer of a neural network; and
the frequency-domain representation of the corresponding spatial filtered output generated for each of the multiple spatial directions is processed using one or more additional neural network layers of the neural network.

15. The system of claim 14, wherein the neural network is part of a speech recognition model.

16. The system of claim 14, wherein the neural network is part of an acoustic model configured to indicate probabilities of sub-word units.

17. The system of claim 14, wherein at least one additional neural network layer of the one or more additional neural network layers is configured to:
- perform feature extraction; and
- apply a transformation to the frequency-domain representation of the corresponding spatial filtered output generated for each of the multiple spatial directions.

18. The system of claim 17, wherein the transformation comprises at least one of:
- a linear transformation;
- a projection;
- a complex linear projection; or
- a linear projection of energy.

19. The system of claim 14, wherein the corresponding spatial filtered output generated for each of the multiple spatial directions comprises a single channel of time-domain data.

20. The system of claim 14, wherein the spatial filtering convolutional layer and the one or more additional neural network layers are jointly trained during training of the neural network.

* * * * *